(12) United States Patent
Wigren

(10) Patent No.: US 8,315,632 B2
(45) Date of Patent: *Nov. 20, 2012

(54) ADAPTIVE ENHANCED CELL IDENTITY POSITIONING

(75) Inventor: Torbjörn Wigren, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 765 days.

This patent is subject to a terminal disclaimer.

(21) Appl. No.: 11/992,920

(22) PCT Filed: Oct. 7, 2005

(86) PCT No.: PCT/SE2005/001485
§ 371 (c)(1),
(2), (4) Date: Apr. 1, 2008

(87) PCT Pub. No.: WO2007/043915
PCT Pub. Date: Apr. 19, 2007

(65) Prior Publication Data
US 2009/0117907 A1 May 7, 2009

(51) Int. Cl.
*H04W 36/00* (2009.01)
(52) U.S. Cl. .................. 455/440; 455/456.1; 455/433; 455/446; 342/457; 342/465
(58) Field of Classification Search ............ 455/440, 455/456.1, 433, 446; 342/457, 465
See application file for complete search history.

(56) References Cited

U.S. PATENT DOCUMENTS

| | | | |
|---|---|---|---|
| 5,003,317 A * | 3/1991 | Gray et al. .................. 342/457 |
| 5,327,144 A | 7/1994 | Stilp et al. | |
| 5,508,707 A * | 4/1996 | LeBlanc et al. ............. 342/457 |
| 6,026,304 A | 2/2000 | Hilsenrath et al. | |
| 6,393,294 B1 | 5/2002 | Perez-Breva et al. | |
| 6,421,009 B2 * | 7/2002 | Suprunov ...................... 342/465 |
| 6,816,170 B1 * | 11/2004 | Udeshi .......................... 345/660 |
| 7,072,666 B1 | 7/2006 | Kullman et al. | |
| 8,175,061 B2 | 5/2012 | Wigren | |

(Continued)

FOREIGN PATENT DOCUMENTS

DE 1 014 2951 4/2003

(Continued)

OTHER PUBLICATIONS

International Search Report for PCT/SE2005/001485 mailed May 9, 2006.

(Continued)

*Primary Examiner* — Nimesh Patel
(74) *Attorney, Agent, or Firm* — Nixon & Vanderhye P.C.

(57) ABSTRACT

Position determination assisting data is provided for performing position determinations based on this assisting data. The position determination assisting data comprises area definitions, each of which being related at least to a respective cell relation configuration. The cell relation configuration is determined at least by cell-IDs of cells fulfilling a specific radio condition criterion when received. Preferably, the cell relation configuration is also dependent on relative radio conditions between different cells and/or transmission mode. The area definitions are in particular example embodiments polygons, which preferably are re-calculated successively, automatically and on-line. The recalculations are based on high-precision position measurements of opportunity, clustered at least with respect to prevailing cell relation configuration for that user equipment performing the high-precision position measurements. Preferably, the area definitions are calculated with a predefined confidence level.

48 Claims, 13 Drawing Sheets

U.S. PATENT DOCUMENTS

| | | | |
|---|---|---|---|
| 2002/0193104 A1* | 12/2002 | Scherzer et al. | 455/423 |
| 2003/0096620 A1 | 5/2003 | Ozturk et al. | |
| 2003/0146871 A1 | 8/2003 | Karr et al. | |
| 2004/0067759 A1 | 4/2004 | Spirito et al. | |
| 2005/0192024 A1 | 9/2005 | Sheynblat | |

FOREIGN PATENT DOCUMENTS

| | | | |
|---|---|---|---|
| WO | WO 91/07043 A1 | 5/1991 |
| WO | WO 96/07284 A1 | 3/1996 |
| WO | WO 97/15995 A1 | 5/1997 |
| WO | WO 2004/023155 | 3/2004 |
| WO | WO 2006/086788 A1 | 8/2006 |
| WO | WO 2007/086784 | 8/2007 |

OTHER PUBLICATIONS

Written Opinion for PCT/SE2005/001485 mailed May 9, 2006.
International Preliminary Report on Patentability for PCT/SE2005/001485 mailed Nov. 27, 2007.
U.S. Appl. No. 12/477,841, filed Apr. 29, 2009; Inventor: Wigren.
Office Action mailed Apr. 22, 2011 in co-pending U.S. Appl. No. 12/447,841.
International Search Report mailed Jun. 27, 2007 in corresponding Application No. PCT/SE2006/050440 (4 pages).
International Preliminary Report on Patentability and Written Opinion in corresponding Application No. PCT/SE2006/050440 mailed Jun. 27, 2007 (5 pages).
Chinese Office Action mailed Feb. 16, 2011 in corresponding Chinese Patent Application No. 200680065277.X (5 pages).
U.S. Appl. No. 12/447,841, filed Apr. 29, 2009; Inventor: Wigren.
U.S. Appl. No. 12/162,241, filed Jul. 25, 2008; Inventor: Wigren.
Office Action mailed Aug. 17, 2011 in U.S. Appl. No. 12/447,841.
Translation of Chinese Office Action corresponding to Application No. 200680056277; Sep. 29, 2011, 5 pages.
Translation of Chinese Office Action corresponding to Application No. 200680056277; Dec. 31, 2011, 3 pages.
Ester, M. et al., "A Density-Based Algorithm for Discovering Clusters in Large Spatial Databases with Noise", KDD-96 Proceedings, Spatial, Text & Multimedia, pp. 226-231.
Lin, Cha-Hwa et al., "Mobile Location Estimation by Density-Based Clustering for NLoS Environments", Proceedings of the 20$^{th}$ International Conference on Advanced Information Networking and Applications, 2006, 6 pages.

* cited by examiner

| CELL ID |
|---|
| ID1 |
| ID2 |
| ID3 |
| ID4 |
| ID5 |

| No | CELL ID |
|---|---|
| 1 | ID1 |
| 2 | ID3 |
| 3 | ID5 |
| 4 | ID4 |
| 5 | ID2 |

| No | CELL ID | TYPE |
|---|---|---|
| 1 | ID1 | OWN CELL |
| 2 | ID3 | ACTIVE |
| 3 | ID5 | ACTIVE |
| 4 | ID4 | IDENTIFY |
| 5 | ID2 | IDENTIFY |

|   8 | 7 | 6 | 5 | 4 | 3 | 2 | 1 | |
|---|---|---|---|---|---|---|---|---|
| 0 | 1 | 0 | 1 | NO. OF POINTS ||||  OCTET 1 |
| S1 ||||||||  OCTET 2 |
|  |||||||| OCTET 3 |
|  |||||||| OCTET 4 |
|  |||||||| OCTET 5 |
|  |||||||| OCTET 6 |
|  |||||||| OCTET 7 |

⋮

| Sn ||||||||  OCTET 6n-4 |
|---|---|---|---|---|---|---|---|---|
|  |||||||| OCTET 6n-3 |
|  |||||||| OCTET 6n-2 |
|  |||||||| OCTET 6n-1 |
|  |||||||| OCTET 6n |
|  |||||||| OCTET 6n+1 |

ADAPTIVE ENHANCED CELL IDENTITY POSITIONING

This application is the U.S. national phase of International Application No. PCT/SE2005/001485 filed 7 Oct. 2005 which designated the U.S., the entire contents of each of which are hereby incorporated by reference.

TECHNICAL FIELD

The technology relates in general to methods and systems for position determination of mobile terminals in a cellular communications network, and in particular to such position determination involving cell areas.

BACKGROUND

All cellular communications systems are divided into cells, where User Equipment (UE) served by one, or when in soft(er) handover several base stations. Each base station may serve UEs in more than one cell. The important point from a positioning and navigation perspective is that the cell where a specific UE is located is known in the cellular system. Hence, after determination of the geographical area covered by a specific cell; it can be stated that the UE is located somewhere within said geographical area, as long as it is connected and the reported cell identity of the serving cell is equal to the cell identity corresponding to the particular geographical area.

An example of positioning within a Wideband Code Division Multiple Access (WCDMA) cellular system operates briefly as follows, assuming that the positioning operates over the Radio Access Network Application Part (RANAP) interface. The procedures are however similar for e.g. the Global System for Mobile communications (GSM) and Code Division Multiple Access 2000 (CDMA 2000).

A message requesting a location estimate is received in the Serving Radio Network Controller (SRNC) over the RANAP interface. The quality of service parameters of the message is assumed to be such that the Radio Network Controller (RNC) selects the cell identity positioning method. The SRNC determines the serving cell identity of the UE to be positioned and retrieves a pre-stored polygon that represents the extension of the serving cell. The SRNC sends the resulting cell polygon back to the core network over the RANAP interface, using a cell polygon format in a location report message.

It should, however, be noted that due to the complexity of the radio propagation, the cell polygon format is only an approximation of the extension of the true cell. The selection of the polygon format is dictated by the need to have a reasonably flexible geographical representation format, taking e.g. computation complexities and reporting bandwidths into account.

Since the polygon format approximates the cell extension, the polygon is normally pre-determined in a cell-planning tool to represent the cell extension with a certain confidence. The confidence is intended to represent the probability that the UE is located within the polygon, conditioned on the fact that it is connected to the cell that is represented by the cell polygon. The underlying off-line calculation of the cell polygon can e.g. be based on coverage simulations of varying levels of sophistication. However, the end result is normally not very reliable when the confidence of the calculated cell extension is considered.

The accuracy of the cell identity positioning method is mainly limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact. The advantages has led to an interest for the development of Enhanced cell identity (E-cell ID) positioning methods that aim at enhancing the accuracy of the basic cell identity method at the same time as the advantages of the method are retained.

One principle for E-cell ID positioning aims at combining the cell extension model with a distance measure. Two possibilities towards this end are Round Trip Time (RTT) measurements and path loss measurements. The most accurate of these two alternatives is the RTT measurement. The path loss measurement suffers from shadow fading effects, which result in accuracies that are of the order of half the distance to the UE. In the RTT measurement principle, the travel time of radio waves from the Radio Base Station (RBS) to the UE and back is measured. The RTT method alone defines a circle around the RBS. By combining this information with the cell polygon, left and right angles of the circle can be computed.

Another idea for enhanced cell identity positioning has been to use pre-calculated maps of the regions where the UE is in soft(er) handover with one or several cells. Such areas are significantly smaller than the whole cell opening up for a better accuracy of the determined position. Normally these maps are pre-calculated in the planning tool, exactly as the ordinary cell polygons.

In some situations high-precision positioning is required. In the present disclosure, "high-precision positioning methods" are defined to denote positioning methods that have a potential to meet the North-American E-911 emergency positioning requirements. Methods that meet these requirements are capable of obtaining positioning accuracies of:

either (terminal based) 50 meters (67%) and 150 m (95%), or (network based) 100 meters (67%) and 300 m (95%).

Assisted Global Positioning System (A-GPS) positioning is an enhancement of the Global Positioning System (GPS). GPS reference receivers attached to e.g. a cellular communication system collect assistance data that, when transmitted to GPS receivers in terminals connected to the cellular communication system, enhance the performance of the GPS terminal receivers. Typically, A-GPS accuracy can become as good as 10 meters. Additional assistance data is collected from the cellular communication system directly, typically to obtain a rough initial estimate of the position of the terminal together with a corresponding uncertainty of the initial estimate. This position is often given by a cell identity positioning step.

The Uplink Tune Difference Of Arrival (UTDOA) positioning method is based on time of arrival measurements performed in several RBSs of transmissions from the UEs. The signal strengths are higher than in A-GPS, something that enhances the ability to perform positioning indoors. The accuracy of UTDOA is expected to be somewhat worse than that of A-GPS though, mainly because the radio propagation conditions are worse along the surface of the earth than when GPS radio signals are received from satellites at high elevation angles.

SUMMARY

A general problem with existing positioning methods based on cell-ID is that the accuracy of the determined positions is low. The confidence value is normally not determined with the best possible accuracy, with respect to the calculated cell area.

A general object is thus to provide for methods, devices and systems with improved position determination accuracy. A further object is to provide for methods and devices providing positioning assisting data allowing for position determinations of a higher accuracy. Yet a further object is to provide for methods, devices and systems operating with smaller distinguishable areas. It is also a further object is to provide for methods, devices and systems which provides defined areas having a well established confidence value.

The above objects are achieved by methods, devices and systems according to the patent claims that provide position determination assisting data. The position determination assisting data comprises area definitions, each of which being related to a respective cell relation configuration. The cell relation configuration is determined at least on cell-IDs of cells, in which signals to/from a user equipment to be positioned fulfil a specific radio condition criterion. Preferably, the cell relation configuration is also dependent on relative radio conditions between different cells and/or transmission modes. The area definitions are in particular embodiments polygons, which preferably are re-calculated successively, automatically and on-line. The recalculations are preferably based on high-precision position measurements of opportunity, clustered with respect to prevailing cell relation configuration for that user equipment performing the high-precision position measurements. Preferably, the area definitions are calculated with a predefined confidence level. The specific radio condition corresponds in a particular embodiment to radio conditions defining the active set of cells, i.e. cells that are in soft(er) handover with the user equipment. The specific radio condition corresponds in another particular embodiment to radio conditions allowing for measurements on signals, e.g. radio conditions defining the detected set of cells.

The position determination assisting data is preferably used to determine a position of a user equipment. A cell relation configuration for the user equipment to be positioned is determined and the related area definition can be used as an approximation of the user equipment position. The area definition obtained in this manner can also be utilized as refined prior position information for e.g. A-GPS or UTDOA positioning, and to refine RTT positioning.

The technology described in this application also provides devices and systems for carrying out the methods described above. All functionality is in a typical example embodiment may be located in a positioning node, e.g. a RNC, a SAS (Stand Alone SMLC (Serving Mobile Location Centre)) node, a support node for configuring and monitoring of the system, or in a completely stand alone node. However, it is also possible to have different parts implemented in different nodes communicating with each other.

There are numerous advantages. For example, database of area definitions for cell relation configurations are built up adaptively and automatically. In preferred example embodiments, the area of the area definitions, typically a cell polygon, is minimized, for a specific value of the confidence. This maximizes the accuracy of the cell identity positioning method. The confidence is easily determined accurately. The performance of the UTDOA and A-GPS positioning methods can be improved by initial positioning data obtained using technology described in this application. The area definition information is automatically refined, a fact that is useful e.g. when parts of the Radio Network (RAN) is re-planned.

BRIEF DESCRIPTION OF THE DRAWINGS

FIG. 6 is an illustration of a 3GPP polygon message information element;

DETAILED DESCRIPTION

In the present disclosure "position determination assisting data" is used to define data that is used in cell-related activities in cellular communications system, such as radio network planning or positioning based on cell-ID. In particular, it may refer to the cell relation configuration and related area definitions used in the present disclosure. This should not be mistaken for "assistance data", which in the present disclosure is used solely in A-GPS discussions.

In the present disclosure, WCDMA systems are used as a model system. However, anyone skilled in the art realizes that the basic principles are applicable to any cellular communication system. The technology described in this application is thus not limited to the exemplifying embodiments as such.

Figure 1:
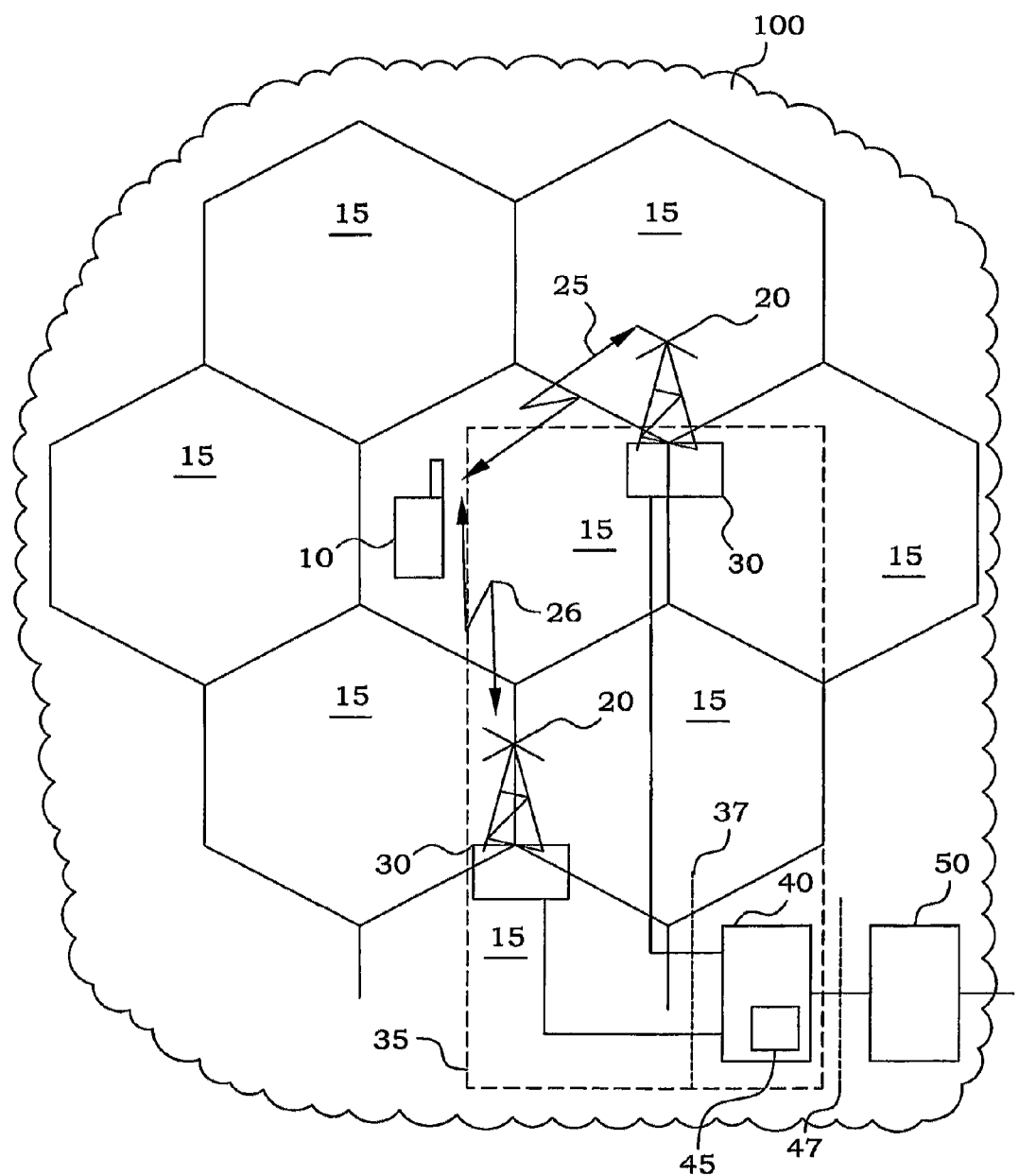
FIG. 1 is an illustration of a cellular communications system.

FIG. 1 illustrates a general WCDMA system 100. Radio base stations 30 (RBS) are spread over the coverage area of the system and serves antennas 20, which in this embodiment are sectorized antennas. A cell 15 is associated with each sector of the antennas 20, as the area in which connection to the communications system preferably is performed through that particular sector. The RBSs 30 are connected to a Radio Network Controller (RNC) node 40, which in a typical case comprises a positioning node 45. The UEs 10 and the RNC 40 communicates over the so-called RRC (Radio Resource Control) interface 37 that is transparent to the RBS 30. The RBSs 30 and the RNC 40 are nodes comprised in the UTRAN (Universal Mobile Telecommunication System Radio Access Network) 35. The RNC 40 is further connected to the Core Network (CN) 50 of the communications system 100 via a RANAP (Radio Access Network Application Part) interface 47.

A user equipment (UE) 10 is situated in the area covered by the cellular communications system 100. The user equipment communicates with the own radio base station 30 through signals 25. However, also signals 26 from and to neighbouring RBSs 30 may be possible to detect. If the neighbouring signals 26 are strong enough for supporting actual communication, the corresponding cell could be included in a so-called active set of cells, which participates in soft(er) handover. By soft handover is meant the case where two different non-colocated RBSs are used, whereas softer handover refers to one RBS with several sectors. A special case is when the UE is connected to two sectors of the same RBS, i.e. softer handover. However, for this application, there is no substantial difference between soft and softer handover and both cases can be handled analogously. The signal 26 may in some cases be too weak to be included in the active set, but strong enough to allow for identification of the transmitting RBS. Such signals may e.g. be used for positioning purposes. Finally, neighbouring signals 26 may also be too weak to enable any use at all.

When a UE 10 is connected to a certain RBS via certain radio links, the UE 10 is likely to be situated within the associated cell. The cell area, in WCDMA defined by a polygon that describes the cell extension, is normally not determined with the best possible accuracy, with respect to the true extension of the cell. The approximate cell area is typically determined in connection with cell planning and may not correspond perfectly to the real situation. Normally, the actual confidence level of the cell area extension is not specified. Furthermore, radio conditions may also be altered after the cell planning has been preformed. It would therefore be advantageous to tune the confidence and the pre-calculated cell polygon for each cell, using field data. This can normally not be afforded though, in particular since the radio conditions may change with time. The technology described in this application provides a way to obtain such tuning automatically.

Figure 2A:
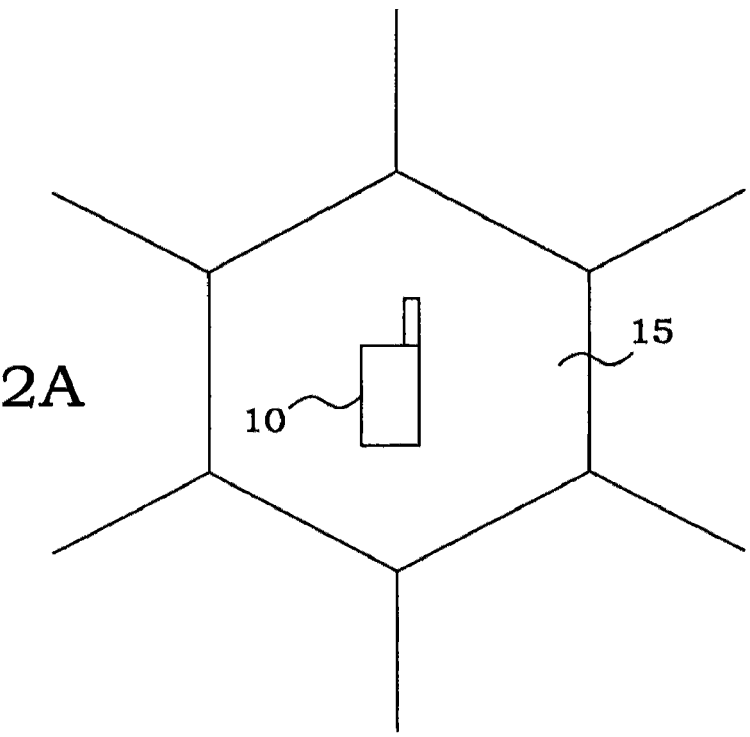
FIGS. 2A-E are illustrations of examples of division of a cell into smaller areas according to coverage from neighbouring cell signals.

FIG. 2A illustrates a cell 15, with a UE 10 connected. For simplicity in the coming explanations, the RBS is in this case assumed to be placed at the centre of the cell, a so-called omni-cell configuration. When the UE 10 is connected to the RBS, it can with a certain probability be determined to be present within the cell 15.

Figure 2B:
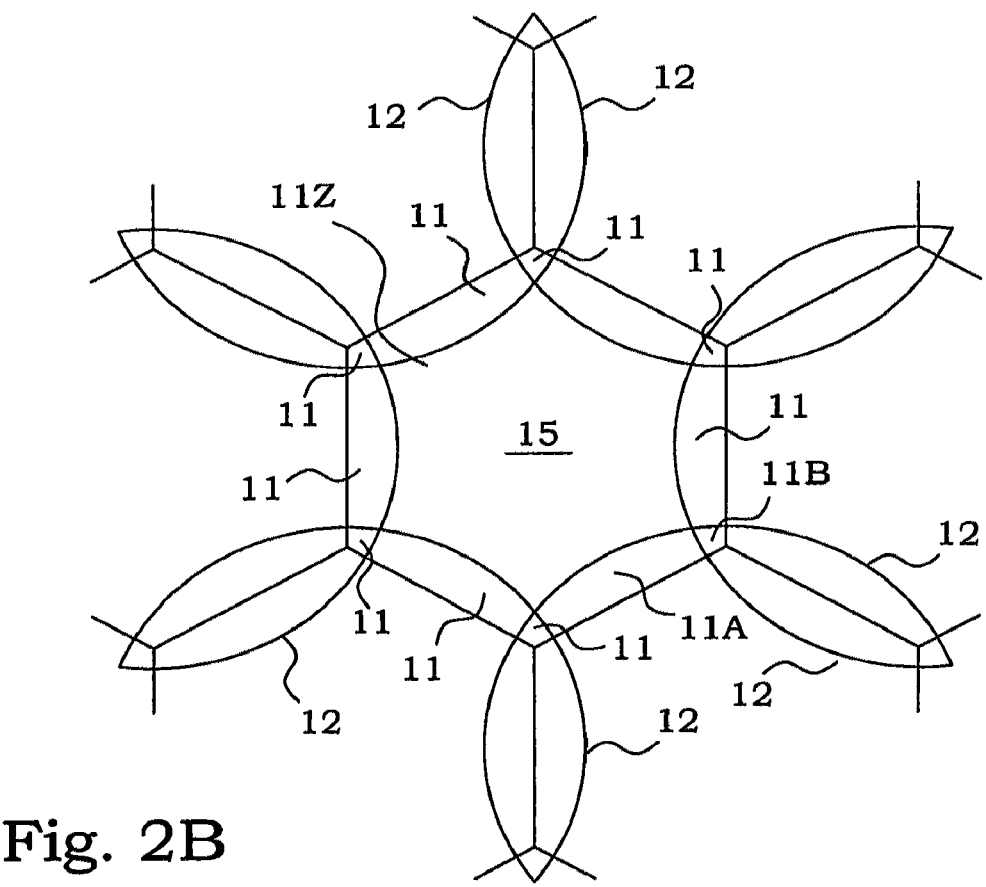

However, as mentioned briefly above, the UE may also be within radio range from other RBSs as well. In FIG. 2B, borders 12 of areas within which signals to/from a neighbouring RBS are strong enough to allow for soft(er) handover are indicated. In this oversimplified model, the borders 12 are drawn as circles, having their centre at a neighbouring RBS. It is easily seen that the borders 12 divide the cell 15 into smaller areas 11, 11A, 11B, 11Z. In the area 11Z, only signals from the own RBS 30 are useful. However, in e.g. area 11A, signals to/from one neighbouring RBS are also useful for soft(er) handover purposes and are thus included in the so-called active set of cells. In area 11B, signals to/from two neighbouring cells are strong enough and the active set then comprises two neighbouring cells. It can now easily be understood, that the content of the active set can be used for positioning purposes. By consulting the active set list, it can be determined in which of the part areas 11, 11A, 11B, 11Z, the UE 10 is likely to be situated.

However, most often, soft(er) handover information is not used for positioning purposes, probably since it is likely to be difficult to compute with a sufficient accuracy. Area definitions that describe any soft(er) handover regions are useful. In WCDMA, such area definitions can conveniently be polygon definitions. However, using prior art cell planning principles would normally not provide area definitions determined with the best possible accuracy, with respect to the true extension of any soft(er) handover regions. Furthermore, the confidence value of any soft(er) handover regions would normally, using prior art methods, not be determined with the best possible accuracy, with respect to any calculated soft(er) handover area. It would therefore be advantageous to tune the confidence and the pre-calculated cell polygon for each cell, using field data. This can normally not be afforded though, in particular since the radio conditions may change with time, even more than for the basic cell. However, the technology described in this application provides a way to obtain such tuning automatically.

Figure 2C:
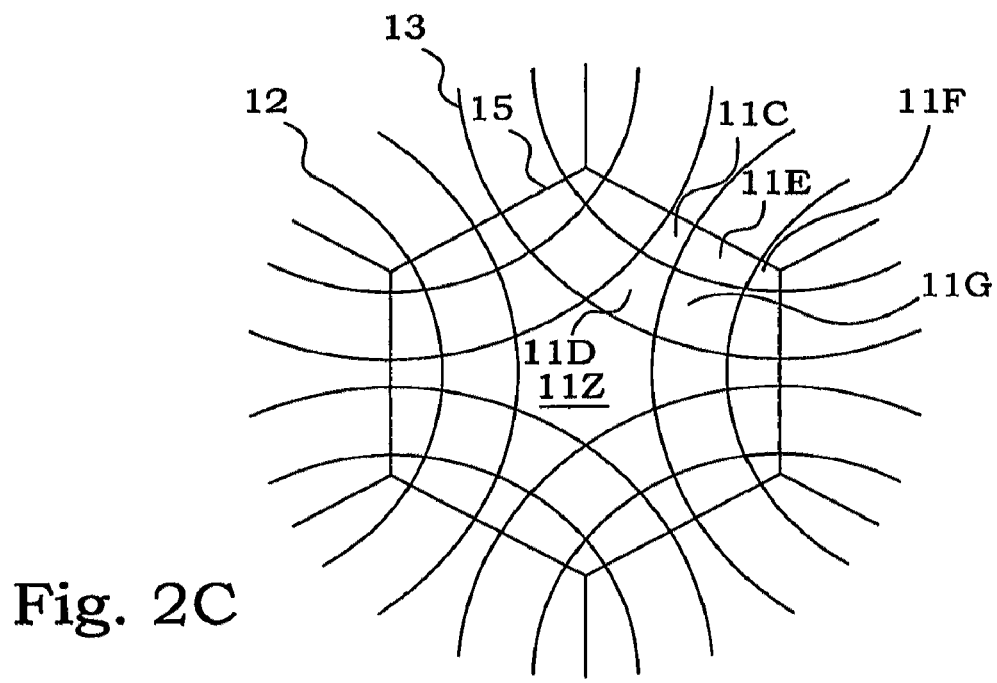

Signals from neighbouring RBSs can be utilized further. As mentioned above, even if the signals to and from neighbouring RBSs are not strong enough for allowing soft(er) handover, they may still be strong enough to enable determination of the identity of the transmitting RBS/UE. Corresponding set of cells is typically referred to as the detected set of cells. Also this information can be used for positioning purposes. In FIG. 2C, the cell 15 is once again illustrated. Now, not only borders 12 for soft(er) handover (of which only one is denoted by a reference number) are illustrated, but also borders 13 of areas in which the identity of the transmitting RBS or UE can be obtained in downlink or uplink, respectively, e.g. corresponding to the detected set of cells. The cell 15 is thereby further divided in even smaller part areas 11, 11C-G, 11Z. For instance, in area 11E, signals from one neighbouring RBS are, besides the signals from the own RBS, used for soft(er) handover, while signals from another neighbouring RBS only are used for identifying the transmitting RBS.

Figure 2D:
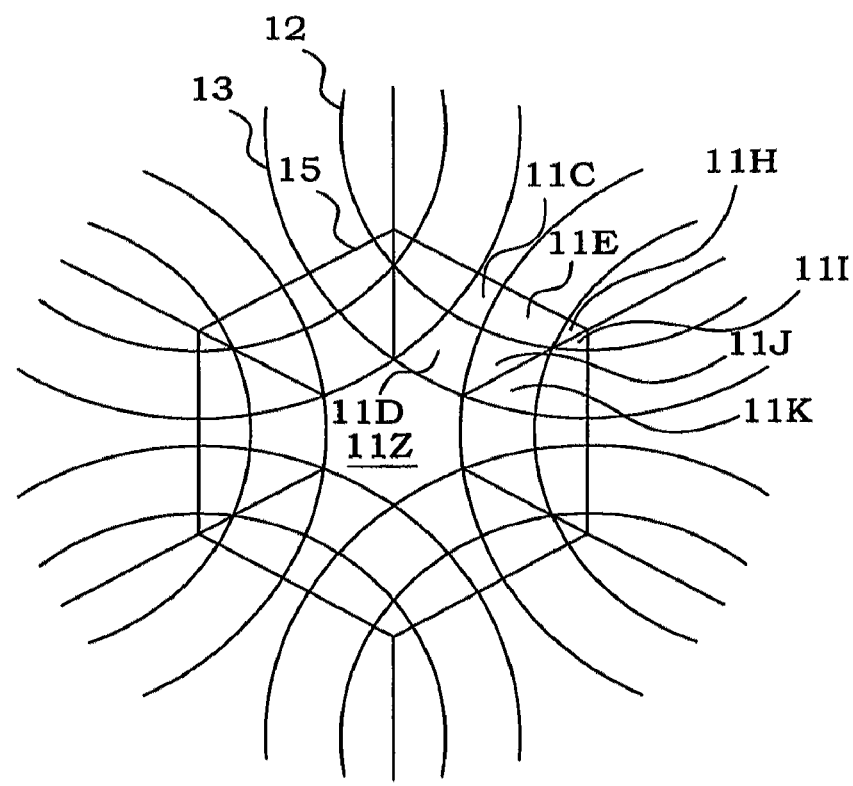

If not only the existence of signals of certain strengths is considered, but also the relative strengths as compared to other signals, an even finer division of the original cell can be achieved. In FIG. 2D, the part areas that involves signals from more than one neighbouring RBS are divided according to which signal that is the strongest. Areas 11H-K are thereby possible to define.

Figures 2E, 3A, 3B, 3C:
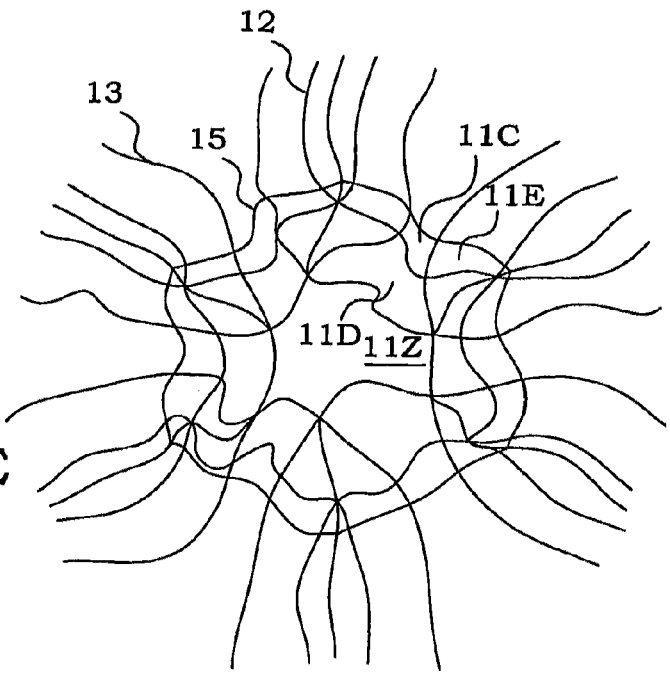
FIGS. 3A-C are illustrations of examples of cell relation configurations.

As mentioned above, the real situation is, however, not so ideal as the examples of FIGS. 2A-D may indicate. Instead, the borders 12, 13 are not easily determined and are typically non-circular. FIG. 2E illustrates a situation that could correspond to a real situation. Anyone skilled in the art, then realises that any theoretical pre-determination of the areas 11, 11A-K, 11Z, is impossible in practice.

Two types of information are connected to each other: cell relation configuration and high-precision positioning data.

The first type of information is a cell relation configuration. This cell relation configuration corresponds to the divisions in the previous examples of FIG. 2A-E. The cell relation configuration comprises in a basic embodiment data representing the "own" cell as well as any neighbouring cell, in which the RBS corresponding thereto transmits/receives detectable signals to/from the user equipment in question which full a certain criterion. In a typical view, the cell relation configuration can be considered as a list of cell identities corresponding to signals fulfilling a specific radio condition criterion with respect to a certain UE. FIG. 3A illustrates an embodiment of such a list. The first row corresponds to the own cell. The cell ID is "ID1". The UE can in this example also communicate with cells "ID2", "ID3", "ID4", "ID5". Each combination of cells will in this embodiment define a particular cell relation configuration.

FIG. 3B illustrates another embodiment of a cell relation configuration. Here, the relative signal strengths are taken into account, and the cells are thereby sorted in strength order. A signal to/from cell "ID3" is thereby stronger than signals to/from e.g. cells "ID5". This means that a cell relation configuration in this embodiment is not only dependent on which cells that are comprised in the list, but also in which order.

There may even be a difference in strength order between uplink and downlink, which also can be utilised in defining areas.

Also other signal-strength related quantities can be utilised for defining the cell relation configuration, e.g. path loss and signal-to-interference ratio.

FIG. 3C illustrates another embodiment of a cell relation configuration. Here, the signal strengths are also classified. It can be seen that cell "ID1" is classified as "the own cell", and cells "ID3" and "ID5" are classified to be comprised in the active set of cells, i.e. they are utilised for soft(er) handover purposes. This means that a cell relation configuration in this embodiment is not only dependent on which cells that are comprised in the list and in which order, but also on the classification of the cells.

In the view of the above examples, anyone skilled in the art realizes that a cell relation configuration is easily obtainable for any UE that is situated within a coverage area of a cellular communications network.

The second type of necessary data is as mentioned further above high-precision positioning data. This can be derived in any possible way. UTDOA and A-GPS are mentioned earlier in the background, but other methods can be useful as well. Relations between high-precision positioning data and cell relation configuration are collected for the corresponding UE at the positioning instant. This is preferably performed by using measurements of opportunity, i.e. high precision measurements that would anyway be performed for some other reason. Alternatively, the measurements could be arranged on purpose. For instance, e.g. for the purpose of improved radio network planning, high-precision position measurement devices could be spread over a certain area in a planned manner. Positions are determined as well as cell relation configurations. Another alternative could be to regularly order user equipment capable of high-precision positioning to provide such measurements. For each possible cell relation configuration (i.e. in a simple view set of ordered cell identities), a measurement list is then setup. All high-precision measurements that are related to a specific cell relation configuration are then collected in one specific list of high-precision measurements. In other words, the high-precision positioning data are clustered dependent on the prevailing cell relation configuration. The measurements of one such list thus form a cluster of measurements that can be expected to be located in a specific geographical area. The clustering of results of the high-precision position determinations thus gives a number of separate clustered results. When a suitable number of high-precision positioning data points are clustered in one of the separate clustered results, it is possible to define an area which contains a pre-determined fraction of the high-precision positioning data points. It can then be concluded that a UE having a certain cell relation configuration is situated within the defined area with a confidence level corresponding to the pre-determined fraction.

In other words, a UE that not by itself has any high-precision positioning capabilities may utilise previous high-precision positioning of other UEs for achieving an improved accuracy in position determination.

It can be noticed that the achieved area definitions can be considerably different from the actual radio coverage. The reason is that areas having good radio conditions but never hosting any user equipments will tend to be excluded from the determined area. The associated area will instead be an area based on a combination of radio coverage properties and probability for user equipment occurrence.

Figure 4A:
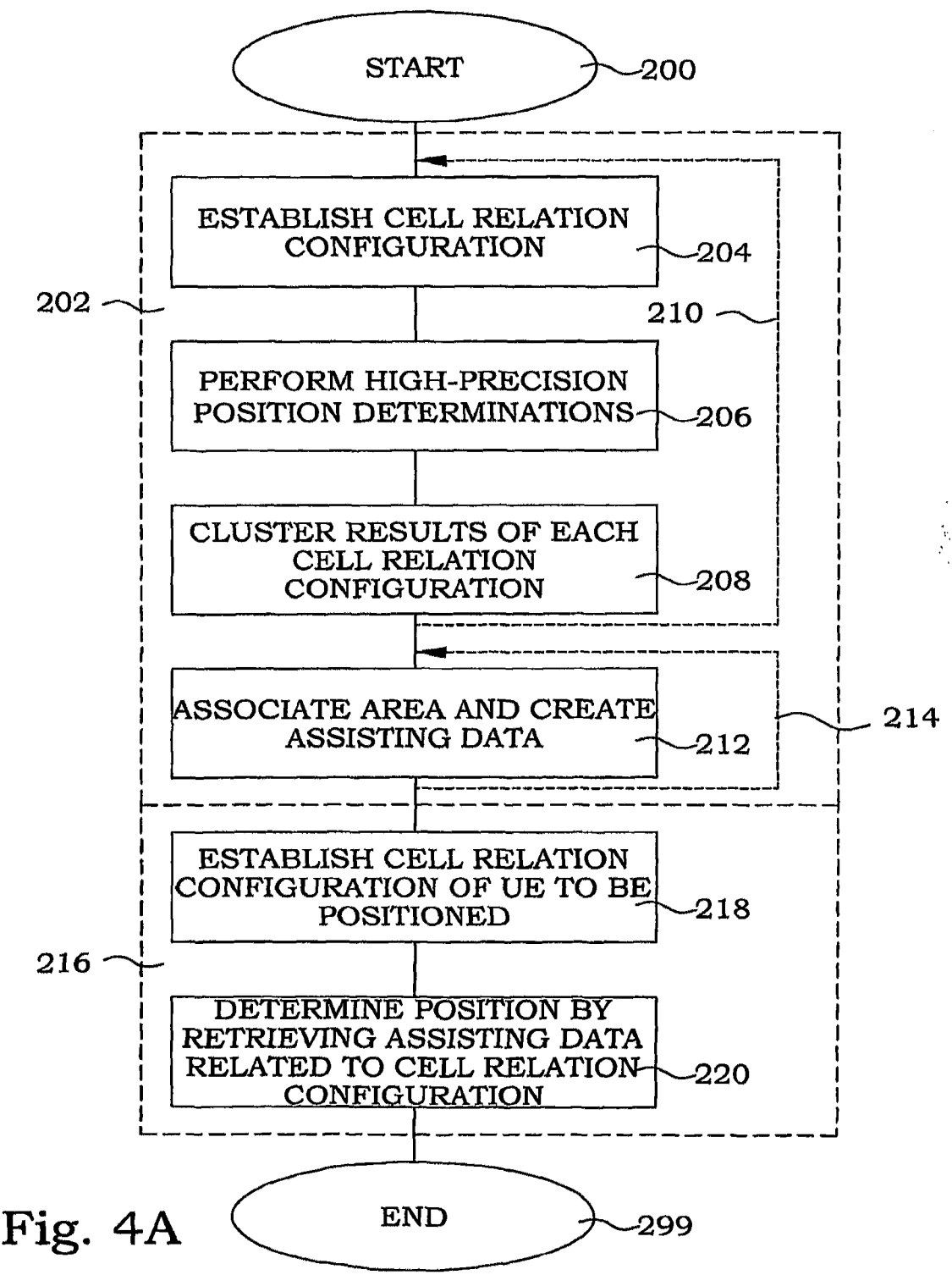
FIG. 4A is a flow diagram of the main steps of an example embodiment.

A flow diagram of the main steps of an example embodiment is illustrated in FIG. 4A. The procedure starts in step 200. The procedure first comes to a section 202 for providing position determination assisting data. This section starts with a step 204, in which a cell relation configuration for a particular UE is determined. The signals are typically registered and reported according to standard cellular communication system procedures and compiled to cell relation configuration. In step 206, a high-precision positioning of the UE is performed, using any suitable high-precision positioning method. In step 208, the high-precision positioning data is clustered dependent on the determined cell relation configuration. The steps 204 to 208 are repeated a number of times, as indicated by the arrow 210.

When an appropriate number of measurement points are available for a certain cell relation configuration, the procedure may continue to step 212, in which an area is determined, which resembles the spatial distribution of the high-precision positioning data. Preferably, an area as small as possible is computed, which still contains a pre-determined fraction of the high-precision positioning data. In other embodiments, one may be satisfied with a fairly small area, even if the area is not the absolute mathematical minimum. A relation between a certain cell relation configuration and an area definition is thereby achieved. If further data is added by the steps 204-208, the step 212 may also have to be repeated as indicated by arrow 214. In particular, if the radio conditions are changing, permanently or for a longer period of time, the area definitions have to be re-calculated and adapted to the new situation. Each high-precision position measurement is then also preferably time stamped in order to make it possible to discard high-precision position measurements that are too old, and successively performing new area optimizations.

The time stamping can also be utilised in systems where the distribution of user equipments is likely to differ considerably between different times. For instance, if an office complex and a residence area are comprised close to each other, it is e.g. more likely to find the user equipments in the residence area during the nights. Such variations can be dealt with by discarding high-precision positioning data having a recording time of the day, of the week or of the year, that is considerably different from the present time. In other words, the clustering can be performed by only selecting measurements fulfilling a certain additional criterion. The area definitions can thereby be made time dependent.

The selection criterion for the clustering can also be made on other parameters. The Radio Access Bearer (RAB) could e.g. be one selection parameter. The coverage for different RABs can differ considerably, and the borders between different part areas can thereby change their position considerably. For instance, traffic transmitted by a 64 kbps link may have a completely different coverage area than traffic transmitted by a 384 kbps link. By also clustering the measurements e.g. with respect to the used RAB, will enable an improved positioning, since the area to be determined is unique for the actual RAB used.

The information about the RAB is a type of auxiliary information about circumstances of signalling that makes the selection criterion more area selective. In a general approach, other auxiliary information can also be utilised in an analogue manner. Similarly, there are also auxiliary measurements of signalling properties that can be performed and used as a part of the selection criterion. An example is e.g. auxiliary RTT measurements, which is discussed further below. The selection criterion can be thought of as an augmentation of the cell relation configuration.

The step 212 can be performed for one particular cell relation configuration, a group of cell relation configurations or all cell relation configurations as well as for different clustering selection criteria.

The lists of measurements are preferably organized hierarchically so that lists at higher levels can be constructed from lower levels in case the number of measurements at lower (more detailed) level would be insufficient for a reliable computation of a cell polygon.

When a UE is going to be positioned, the procedure enters into the section 216 for position determination. This section starts with a step 218, in which a cell relation configuration for the UE to be positioned is determined. This is typically performed in an analogue manner as in step 204. In step 220, the relation between a certain cell relation configuration and an area definition is used to provide an area in which the UE to be positioned is situated with a certain confidence. This confidence level corresponds to the pre-determined fraction used during the area optimization. The procedure ends in step 299. The accuracy of the positioning may in the best cases be enough for e.g. the North-American E-911 emergency positioning requirements. However, positions achieved in this manner should not be used to improve the area definitions according to the section 202.

Figure 4B:
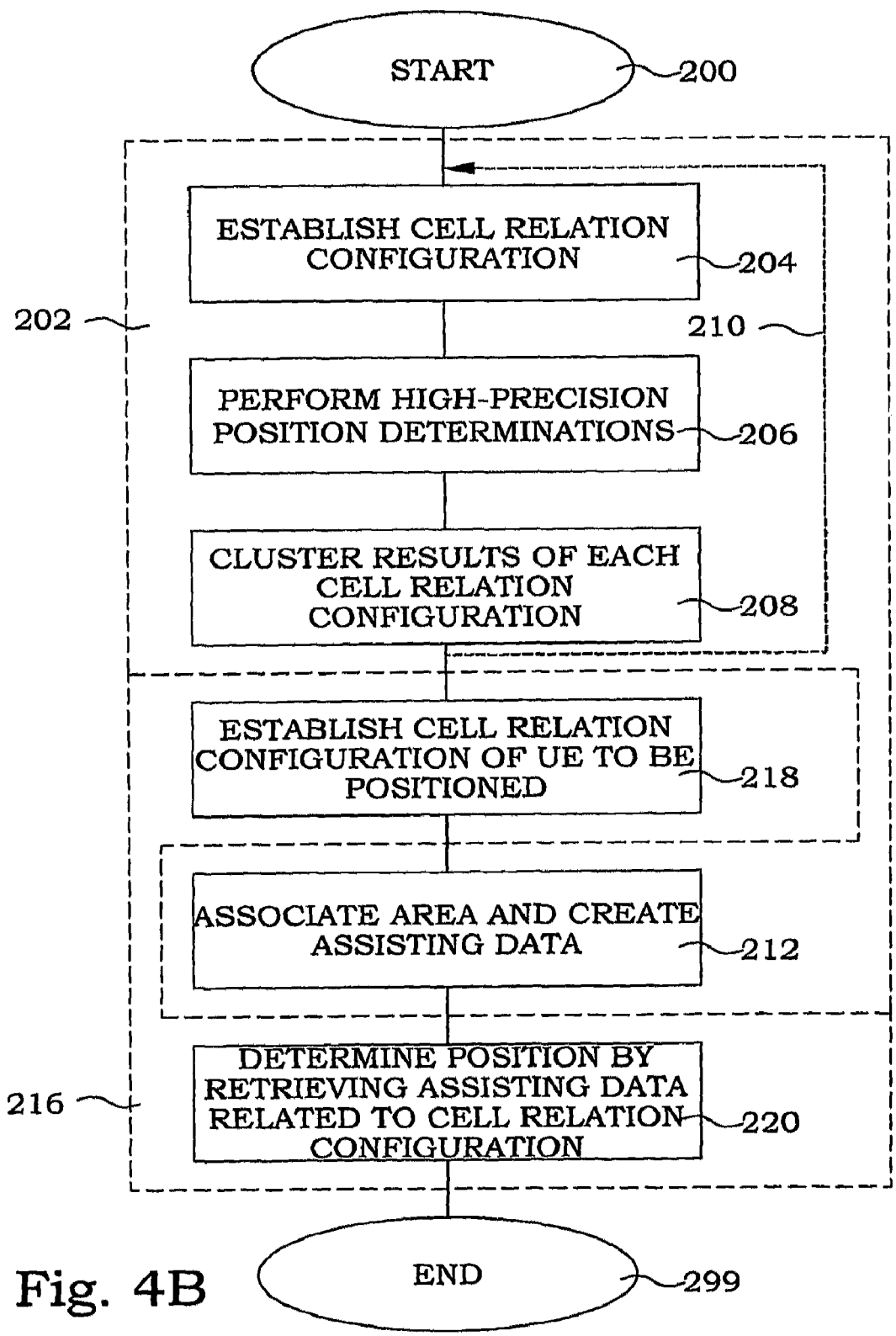
FIG. 4B is a flow diagram of the main steps of another example embodiment.

The timing of the different steps can be somewhat differing. In FIG. 4B, a flow diagram of another example embodiment is illustrated. Here the two sections 202 and 216 are interleaved with each other. The step of optimising the area 212 is here triggered by the step of determining the cell relation configuration 218. The optimising step 212 is then preferably performed just for the cell relation configuration that was determined in step 218, in order to save time. If the relations are determined in advance, i.e. before the actual positioning request occurs, as in FIG. 4A, the positioning can be performed with a shorter delay. The embodiment of FIG. 4B instead ensures that the latest available data always is utilized.

Figure 4C:
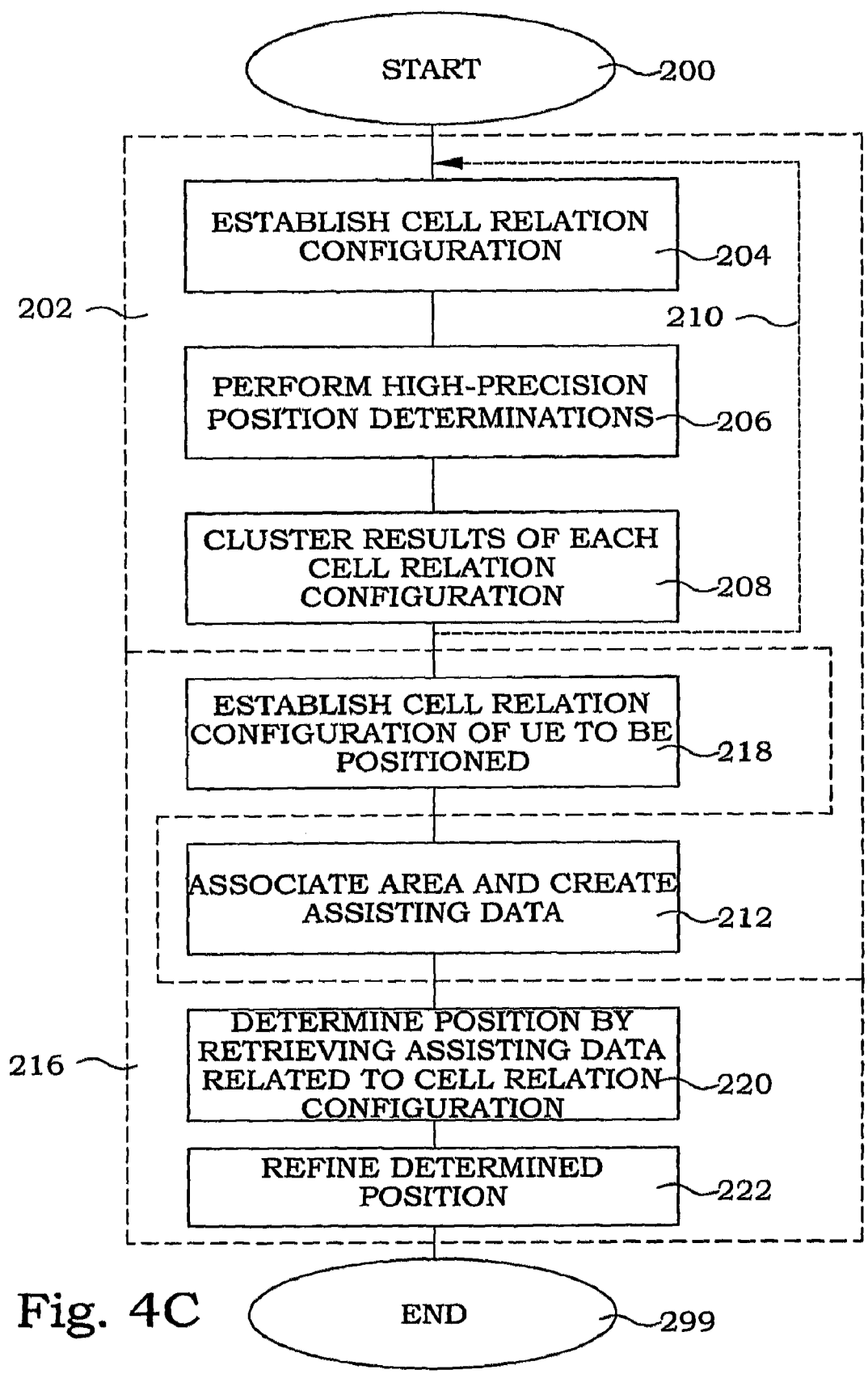
FIG. 4C is a flow diagram of the main steps of yet another example embodiment.

The position determined in step 220 can constitute the final positioning, or it can constitute assistance data for a refined positioning. This is illustrated in FIG. 4C. Here an extra step 222 is included, where the position as achieved from the relation of step 220 is utilised in a further positioning method in order to refine the positioning further. Such further positioning methods can e.g. be RTT positioning or A-GPS positioning, which are discussed further below.

Figure 4D:
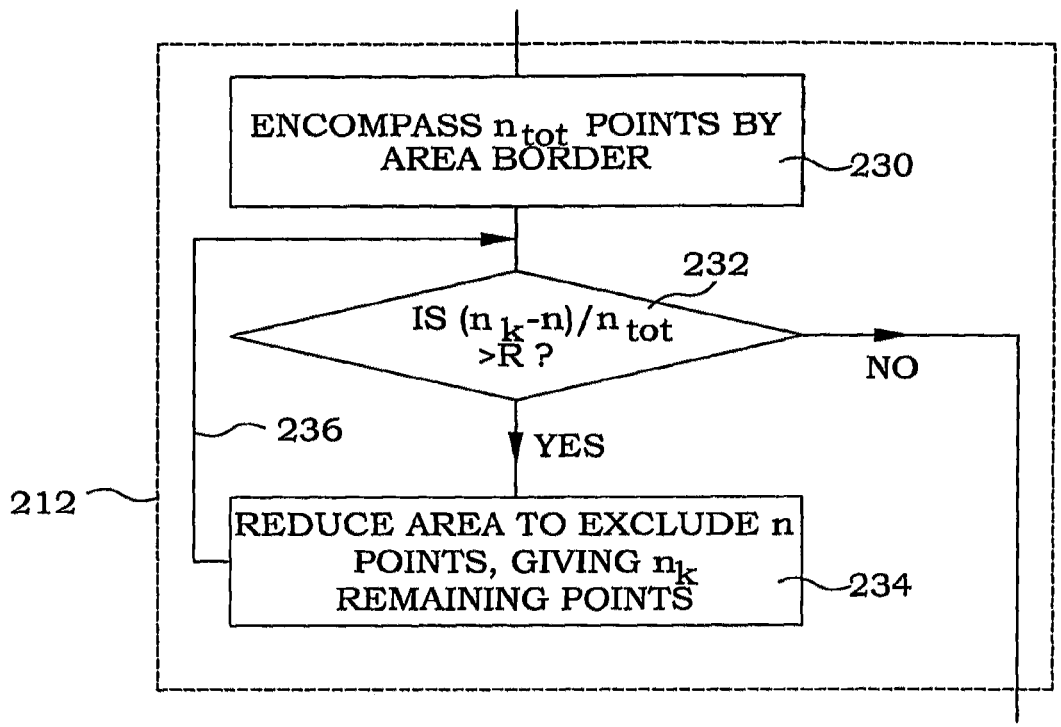
FIG. 4D is a flow diagram of the steps of an embodiment of step 212 of FIGS. 4A-D.

In FIG. 4D, a presently preferred example embodiment of step 212 is described more in detail. In step 230, all the high-precision measurement points, $n_{TOT}$, for the cell relation configuration in question are encompassed by an area border. $n_{TOT}$ is subsequently used as the inputted number of high-precision measurement points in the first iteration of the following step. In step 232, it is checked if the ratio $(n_k-n)/n_{TOT}$ is larger or equal to a predetermined fraction R, where n is the number of high-precision measurement points that is intended to be removed during the next iteration of the routine. If the ratio is large enough, the area reduction can proceed at least one step further, and the procedure continues to step 234. In step 234, the area is reduced according to a certain pre-determined action plan to exclude n of the inputted high-precision measurement points, leaving $n_k-n$ remaining points, which is set as the new inputted number of high-precision measurement points for the next iteration. Preferably, step 234 is performed in such a way that the area is minimized or at least reduced. The process returns to step 232 again, which is illustrated by the arrow 236. If the ratio in step 232 becomes smaller than R, the process is interrupted, since one iteration more would cause the ration to fall below R, and the area is subsequently used as the area associated with the cell relation configuration in question.

Figure 5:
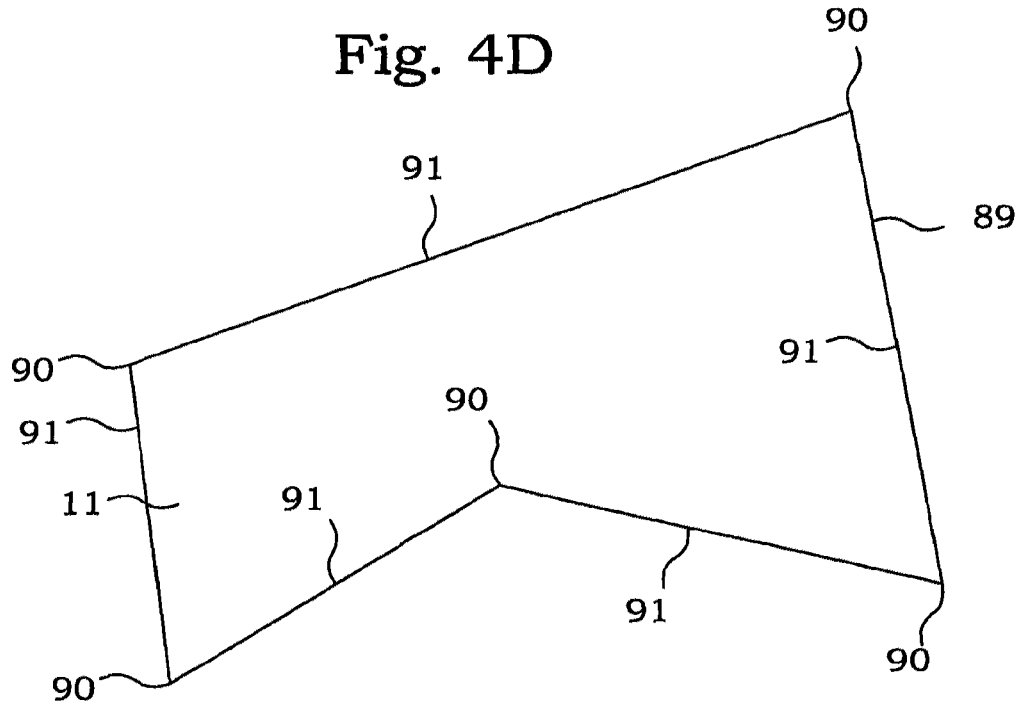
FIG. 5 is an example of a cell polygon.

In several systems, among these the WCDMA (Wideband Code Division Multiple Access) system, the preferred representation of the geographical extension of the cell is given by a cell polygon format. The extension of a cell is described by 3-15 corners of a closed polygon which does not intersect itself. The format is two-dimensional and the corners are determined as pairs of longitudes and latitudes in the WGS84 geographical reference system. An example is illustrated in FIG. 5. There, an example of a cell polygon 89 with corners 90 is illustrated. The RBS (Radio Base Station) is typically located close to one of the corners 90 of the cell polygon 89 said RBS serves. 3GPP systems provide for a messaging format for cell polygons. FIG. 6 illustrate the used 3GPP Polygon message IE (Information Element). This IE is present in the LOCATION REPORT message that is returned to the core network over the RANAP interface after a successful cell identity positioning.

When used as cell-ID positioning method, a re-calculated polygon, rather than the pre-calculated polygon, that corresponds to the specific identity of the cell is reported over RANAP or Iupc (a logical interface between a RNC and a SAS within the UTRAN). The re-calculated polygons are consistent with the reporting format, fitting directly into existing positioning interfaces.

If used as enhanced cell identity positioning, making use of soft(er) handover active sets or detectable cell sets, a similar reporting can take place. In case there is a re-calculated polygon stored for the determined cell relation configuration, then the re-calculated polygon is selected and reported over RANAP or Iupc. Again, the technology fits directly into the existing positioning interfaces.

The area definition data should be organized so that it can be efficiently addressed using cell relation configuration information. In this way, fallback areas covering replacement regions, can be found whenever areas for certain regions have not been computed. Note that this situation may occur, e.g., because of insufficient measurement statistics.

For instance, in case no polygon is computed for the specific cell relation configuration, then the hierarchical structure of the stored cell relations and area definitions is exploited in some way. One alternative is to disregard the last cell identity of the cell relation configuration and look for the re-calculated polygon for the so reduced cell relation configuration. In case there is a re-calculated polygon for this reduced cell relation configuration, then this polygon is reported over RANAP or Iupc. In case there is still no polygon computed then the second last cell identity of the cell relation configuration is removed and the procedure repeated. This procedure can continue up to top level, where the cell relation configuration corresponds to the serving cell. In case there would still not be a re-calculated polygon, the pre-calculated polygon can be used. It should be noted that there are many alternative strategies that are possible here.

Presently preferred non-limiting example embodiments for optimizing polygons are presented in detail in Appendix A. Briefly, one embodiment is simply focused on minimizing the total cell area around the clustered results while maintain a constraint of the confidence value. A non-linear optimization problem can be formulated and solved for this procedure.

Another embodiment is directed to a simple method for successively shrinking the cell area. The method is initiated by encompassing the clustered results associated with the cell relation configuration(s) in question by a polygon. The shrinking procedure is then based on altering the position of one corner of the polygon at a time along a first predetermined path according to predetermined routines or rules. Typically, these rules allow for exclusion of a predetermined number of high-precision position determinations from the interior of the shrinking polygon. Preferably, the corner capable of giving the best improvement according to a predetermined criterion is selected to be moved in each step. The predetermined criterion can e.g. be an as large area reduction as possible. The predetermined criterion can alternatively be an as large distance reduction as possible between the centre of gravity of all high-precision position determinations within the area and a polygon corner. In particular, the corner selection can be decided by making tentative alterations of each corner and check what improvements on the predetermined criterion they will cause. This corner altering step is then repeated until only a predetermined percentage of the high-precision position determinations of the cluster remains within the polygon. The first predetermined path is typically a curve through the original corner position and the centre of gravity for the clustered high-precision positions. In the simplest form, the curve is a straight line through the original corner position and a centre of gravity.

In a particular embodiment of the present invention, the altering of the polygon corner allows one of the high-precision position determinations to be placed outside the polygon, but not two of the high-precision position determinations. This typically brings one of the clustered high-precision position determinations to be placed on or in the vicinity of a connection line between the altered corner and a neighbouring corner. In a more elaborate embodiment, the altering can comprise alternative predetermined paths, and the optimum choice among tentative alterations along all these alternatives can be selected.

Figure 11:
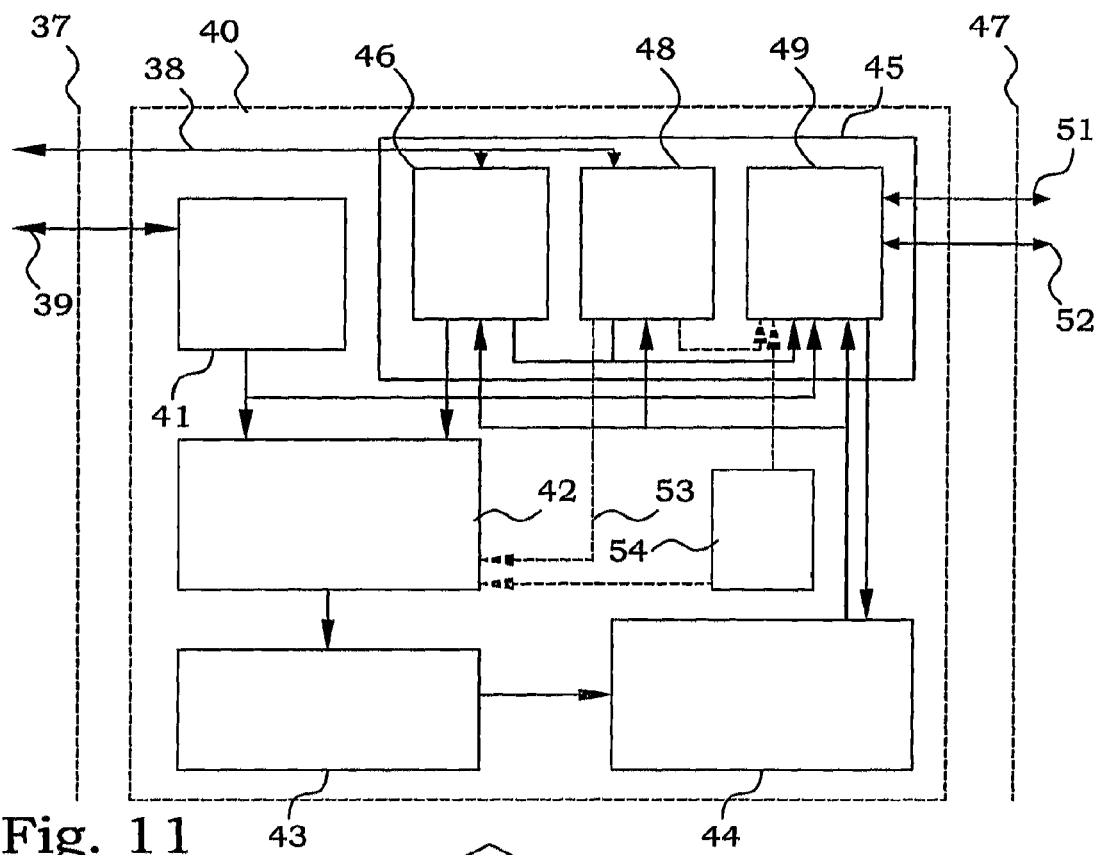
FIG. 11 is a block diagram of the main parts of an example embodiment of a node.

FIG. 11 is a block diagram of an example embodiment of a positioning node 45 and related functionality. In the present embodiment, which is assumed to be comprised in a WCDMA system, such functionality is preferably comprised in the RNC 40. Another possibility is to implement the technology in the SAS node (e.g. an Ericsson SMLC) on the other side of the Iupc interface 47. Still another possibility is to log measurements and perform the algorithms in OSS-RC or even a completely external node. New interfaces and/or information elements in existing interfaces allowing for exchange of detected cell sets and measured high-precision position determination results may then be necessary.

In the case the position determination assisting data, i.e. the relations between the cell relation configurations and the associated areas are produced in an external node, the information has to be provided to a positioning node in order to assist in position determination procedures. The position determination assisting data can then preferably be stored at a computer readable medium, and supplied to the positioning node in a suitable manner, e.g. by downloading the content over a communication link or simply by providing a data memory device having the data stored therein.

The RNC 40 communicates with UEs, transparently via RBSs, using the RRC interface 37. In the present context, at least two information types are of interest; positioning measurements 38, in particular high-precision positioning measurements, and neighbouring cell signal measurements 39, e.g. handover measurements. The neighbouring cell signal measurements 39 are provided to cell relation configuration determining section 41, determining the cell relation configuration. In a particular embodiment, the cell relation configuration determining section 41 can be based on a prior-art active set functionality. The determined cell relation configuration of a particular user equipment is provided to a clustering section 42.

The positioning measurements 38 are provided to the positioning node 45. The high-precision positioning measurements are provided to a high-precision positioning section 46, which e.g. can comprise UTDOA or A-GPS based positioning. Other positioning measurements, e.g. cell ID or RTT positioning measurements are in the present embodiment provided to a medium-precision positioning section 48. The outcome of the analysis of the high-precision positioning measurements, i.e. high-precision positions are provided to the clustering section 42, where the high-precision position is associated with a corresponding cell relation configuration. The measurements are clustered depending on the cell relation configuration and in particular embodiments also on other selection criteria such that auxiliary information and/or auxiliary measurements, in particular recording time, utilised RAB and/or RTT measurements. RTT measurements could then, e.g., be provided by the medium-precision positioning section 48 as indicated by the broken arrow 53. Auxiliary information, such as time or utilised RAB, and other auxiliary measurements can be provided by an auxiliary information section 54. This auxiliary information section 54 can be arranged to provide the information internally in the node and/or be arranged to achieve the information from outside.

The clusters of positions for a certain cell relation configuration and in some embodiments selected within a specific time interval or using a specific RAB are provided to an algorithmic block 43. In the algorithmic block 43, area definitions are calculated. One important objective of the present invention, to compute an area that describes each cluster of measurements, at a specified confidence level, is performed in the algorithmic block 43. In the WCDMA case, the preferred area definition is a polygon defined by 3 to 15 corner coordinates. In a particular embodiment, the algorithmic block 43 provides polygons such that the probability that a given fraction of high-precision measurements of a cluster are located in the interior of the polygon. This algorithmic block 43 preferably performs repeated re-calculations of polygons, for all measurement clusters with a sufficient number of recent enough high-precision measurements. The area definitions are provided to an area storage 44, where polygons representing a hierarchically organized set of cell relation configurations are stored. The stored polygons are then used by positioning algorithms of the system. The data structure of the stored polygons preferably contains a list of pointers covering each relevant cell relation configuration. Each such pointer points to a corresponding 3-15 corner polygon, computed repeatedly as described above. The data structure preferably also contains a time tag for each polygon that defines the time when the polygon was computed.

When a position determination is requested, a cell relation configuration is determined in the cell relation configuration determining section 41 as usual. The result is forwarded to a control section 49 in the positioning node 45. When a positioning request 51 is received, e.g. a so-called Location Reporting Control message over the RANAP interface 47, the control section 49 may, based on quality of service parameters and UE capability, request a position determination by retrieving an area definition from the area storage 44, which corresponds to the present cell relation configuration of the UE. The achieved area definition, preferably a polygon definition is included in a positioning reporting message 52, which typically is sent back over the RANAP interface 47 using e.g. a so-called Location Report message. As in the phase of creating the position determination assisting data, auxiliary information, such as time or utilised RAB, and other auxiliary measurements can also be used to refine the selection of the area definition. Such data is achieved by the auxiliary information section 54.

If the area definitions are to be used together with any additional positioning method, the retrieved area from the area storage 44 is provided to the high-precision positioning section 46 or the medium-precision positioning section 48, depending on the method to be used. The final determined position is then provided to the control section 49 for further reporting.

Most functionalities of the cell relation configuration determining section 41, the high-precision positioning section 46, the medium-precision positioning section 48 and the control section 49 are typically available in prior art systems. However, connections creating relations between the cell relation configuration determining section 41 on one side and the high-precision positioning section 46, the medium-precision positioning section 48 and the control section 49 on the other side are previously unknown. Furthermore, the clustering section 42, the algorithmic block 43, the area storage 44 as well as connections thereto are entirely novel. So is also functionality in the cell relation configuration determining section 41, the high precision positioning section 46, the medium-precision positioning section 48 and the control section 49 needed for communicating with these novel functionalities.

Figure 12:
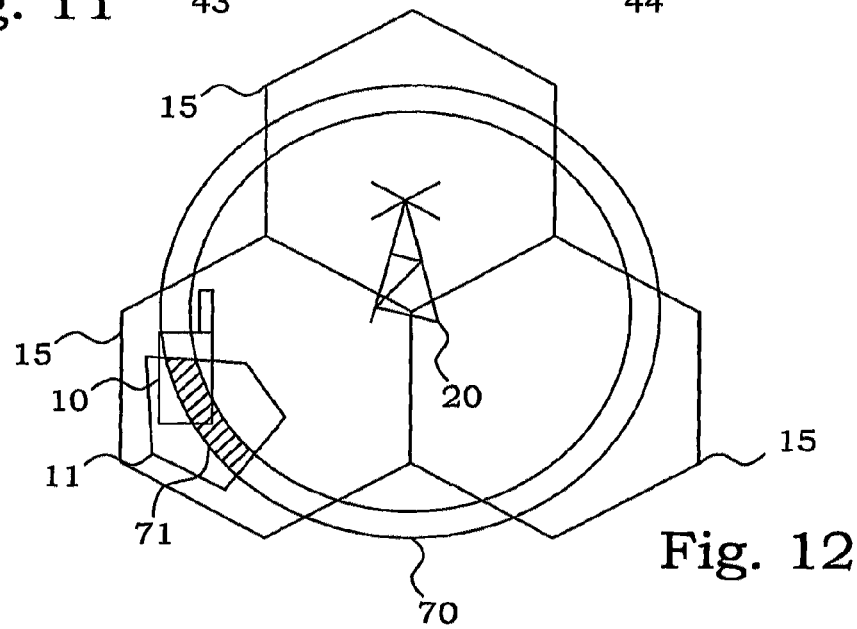
FIG. 12 is an illustration of RTT measurements.

One principle for enhanced cell identity positioning aims at combining the cell extension model (the area definition) with a distance measure. Two possibilities towards this end are round trip time measurements and/or path loss measurements. The more accurate of these two alternatives is the round trip time measurement. The path loss measurement suffers from shadow fading effects, which result in accuracies that are of the order of half the distance to the UE. The round trip time measurement principle is depicted in FIG. 12. Briefly, the travel time of radio waves from the RBS antenna 20 to the UE 10 and back is measured. The distance r from RBS antenna 20 to UE 10 then follows from the formula:

$$r = c \frac{T_{RTT}}{2},$$

where $T_{RTT}$ is the round trip time and where c is the speed of light.

The round trip time measurement alone defines a circle, or if the inaccuracy is accounted for, a circular strip 70 around the RBS antenna 20. By combining this information with the cell 15 polygon, left and right angles of the circular strip 70 can be computed. When an area definition 11 according to the basic principles of the technology described in this application is available, the section 71 of the circular strip 70 on which the UE can be situated can be further decreased, which is evident from FIG. 12.

A combination between the and RTT measurements can also be obtained in an alternative way. In such an embodiment, RTT measurements can be quantified and used as an additional parameter for the selection criterion for the clustering. The use then becomes analogous with the selection based on different RABs. The procedures described above then are used for building areas corresponding to different RTT measurement results. In practice, despite its appeared complexity, this may even be advantageous, since the real radio signal propagation often can be significantly different from theoretical evaluations, making the circular description of FIG. 12 only a rough approximation. In GSM applications, TA measurements corresponding to coarse RTT measurements, could be utilised.

Figure 13:
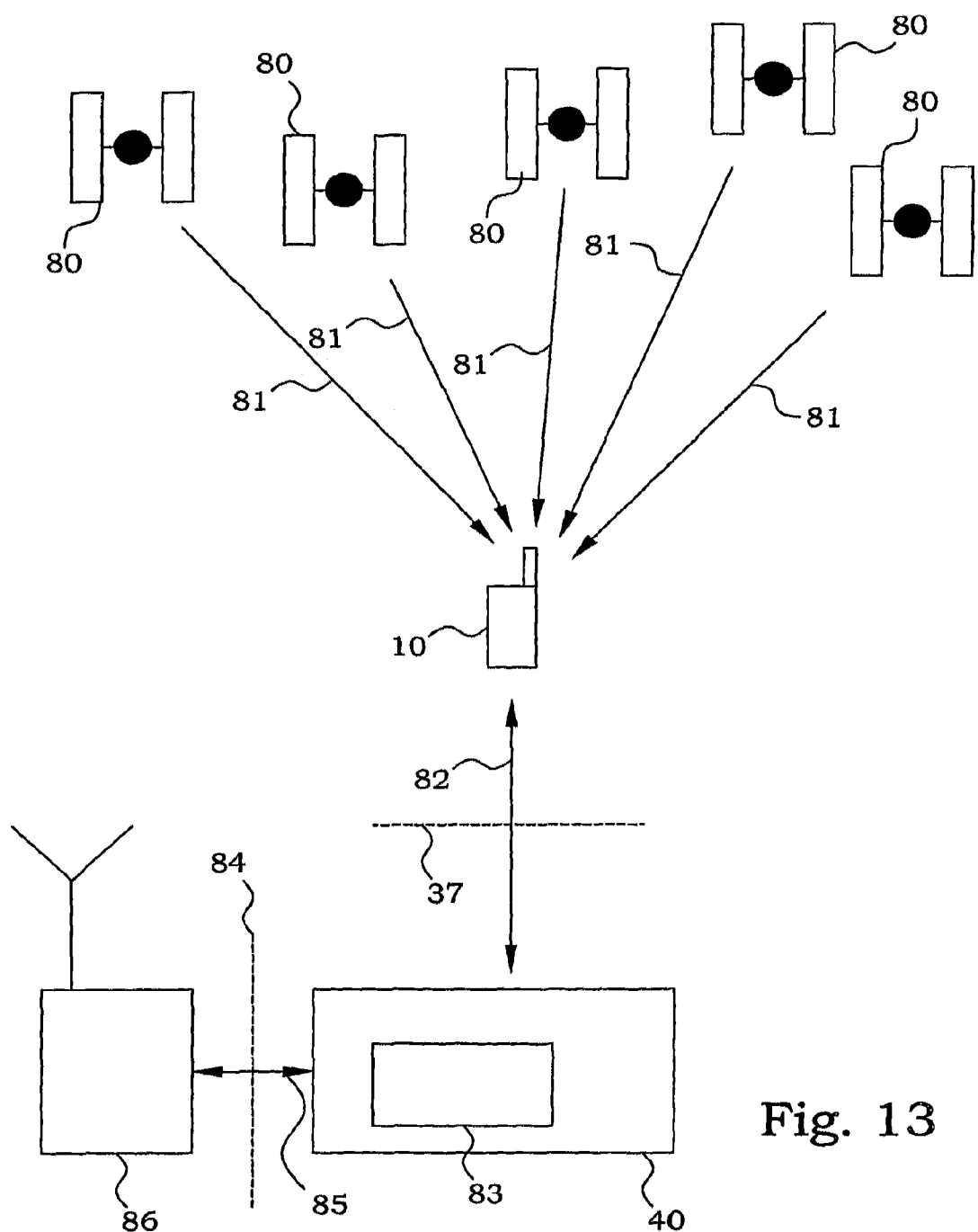
FIG. 13 is an illustration of A-GPS measurements.

Also A-GPS performance can be further enhanced by the technology described in this application. FIG. 13 illustrates a typical A-GPS system. A UE 10 receives GPS ranging signals 81 from a number of space vehicles 80. A reference GPS receiver 86 has knowledge about e.g. synchronisation of the space vehicles 80 and provides assistance data 85 over a reference receiver interface 84 to a GPS interface 83 of the RNC 40. Orders for position measurements and assistance data 82 are provided over a RRC interface 37 to the UE 10. By measuring the arrival times of the different GPS ranging signals 81, the UE is able to determine a high-precision position based also on the assistance data. A report of the determined position is sent back to the RNC 40. The assistance data used for making this position determination involves among other data also an approximate initial position of the UE 10. The more accurate this initial position is, the more sensitive the detection of the GPS ranging signals can be made. This may in turn lead to a more accurate final position, or a final position of an equal accuracy provided within a shorter time or by means of less demanding processing.

If the high-precision positions also include altitude data, i.e. the position defines lateral position as well as height; the "area definitions" can be calculated as surfaces having a three-dimensional extension. A positioning based on such position determination assisting data will then result in a position also defining some kind of altitude estimate. It is then possible e.g. to report the centre point of the cell polygon, augmented with altitude, as a 3D-point over RANAP. The altitude of a polygon corner can also be estimated, e.g. as a mean value of some high-precision measurements in the vicinity of the corner in question.

The embodiments described above are to be understood as a few illustrative examples. It will be understood by those skilled in the art that various modifications, combinations and changes may be made to the embodiments without departing from the scope of the claims. In particular, different part solutions in the different embodiments can be combined in other configurations, where technically possible.

APPENDIX A

The main parts of presently preferred but still example and non-limiting embodiment are described in detail in this appendix.

Clustering

In this particular embodiment, it is assumed that the cell relation configuration is based on the active list of cells, i.e. cells active in soft handover. Corresponding modelling is possible also for other cluster selection rules.

The high-precision position measurements are typically obtained expressed in the WGS 84 geographical reference system. The measurements that are available at time t are denoted $$(lat_j(t_j) long_j(t_j))^T, j=1,\ldots,N(t), \quad (1)$$

where $lat_j(t_j)$ and $long_j(t_j)$ denote the measured latitude and longitude, respectively, at the time $t_j$. N(t) denotes the total number of available measurements at time t. $(\ )^T$ denotes matrix/vector transpose.

At the same time $t_j$ (to within some reasonable accuracy in time), the cell relation configuration is sampled for cell identities. The result is the row vector (or pointer)

$$Configuration(t_j) = (cID_1(t_j) cID_2(t_j) \ldots cID_{N(t_j)}(t_j)), \quad (2)$$

where $cID_l(t_j)$ is the cell identity of the l:th strongest cell in e.g. softer handover, for the UE for which high-precision positioning was performed at time $t_j$. $N(t_j)$ is the number of cells in the cell relation configuration at time $t_j$.

An arbitrary possible pointer used for clustering of measurements, defined according to (2), is now denoted by $$\text{Pointer}_k = (\text{Index}_1(k) \ldots \text{Index}_{N(k)}(k)), k=1, \ldots, K \quad (3)$$

where $\text{Index}_l(k)$ is the l:th component of the (fix) pointer k, $N(k)$ is the dimension of the pointer k and K is the number of counters. The corresponding list of high-precision position measurements is denoted by $\text{List}_k$. At time t:

$$\text{List}_k(t) = \begin{pmatrix} lat_{k,1}(t_{k,1}) & lat_{k,2}(t_{k,2}) & \ldots & lat_{k,M(k,t)}(t_{k,M(k,t)}) \\ long_{k,1}(t_{k,1}) & long_{k,2}(t_{k,2}) & \ldots & long_{k,M(k,t)}(t_{k,M(k,t)}) \\ t_{k,1} & t_{k,2} & \ldots & t_{k,M(k,t)} \end{pmatrix}, \quad (4)$$

where $M(k,t)$ denotes the number of high-precision measurements of list k at time t. As stated above, measurements that are older than a pre-specified threshold are discarded from each list. The maximum size of a list can also be pre-specified, in which case the oldest measurement is discarded irrespective of its age when a new measurement arrives.

When a new high-precision measurement and corresponding cell relation configuration is obtained at time $t_{N(t)+1}$ the clustering algorithm operates as follows:

```
For k = 1 to K
    If Pointer_k = Configuration(t_{N(k)+1})
```
$$\text{List}_k(t_{N(k)+1}) = \begin{pmatrix} \text{List}_k(t) \begin{pmatrix} lat_{N(t)+1}(t_{N(t)+1}) \\ long_{N(t)+1}(t_{N(t)+1}) \\ t_{N(t)+1} \end{pmatrix} \end{pmatrix}$$
```
    end
    else
        do nothing
    end
end
```

Polygon Computation
Notation

In order to facilitate an effective algorithmic description, the following notation is needed:

$p=(p_1 \ldots p_N)$—one specific pointer, corresponding to a specific cell relation configuration.

$r_{i,ll}^P=(x_{i,ll}^P y_{i,ll}^P)^T, i=1, \ldots, N_p$—the polygon corners corresponding to the cell relation configuration p in WGS 84 latitude longitude notation.

$r_i^P=(x_i^P y_i^P)^T, i=1, \ldots, N_p$—the polygon corners corresponding to the cell relation configuration p in a local earth tangential Cartesian coordinate system, with the origin somewhere in the coverage area of the cellular system. Coordinate axes are usually east and north, disregarding the altitude.

$r_{j,ll}^{m,p}=(x_{j,ll}^{m,p} y_{j,ll}^{m,p}), j=1, \ldots, N_p^m$—the high-precision measurements used in order to determine the corners of the polygon corresponding to the cell relation configuration p. Note that this measurements corresponds to one of the entries of $\text{List}_k$ that corresponds to p.

$r_j^{m,p}=(x_j^{m,p} y_j^{m,p}), j=1, \ldots, N_p^m$—the high-precision measurements used in order to determine the corners of the polygon corresponding to the cell relation configuration p. The high-precision measurements are transformed to the same local earth tangential Cartesian coordinate system, with the origin somewhere in the coverage area of the cellular system, which is used above.

$C^p$—The specified confidence of the polygon corresponding to p. This value corresponds to the probability that the UE is located within the polygon, when the cell relation configuration corresponds to P.

$A^p$—The area of the polygon corresponding to p.

$P^p$—The region defined by the polygon.

Coordinate Transformations

The procedure starts by a transformation of all high-precision measurements corresponding to p to the local earth tangential Cartesian coordinate system, in which all computations are performed. Only the new measurements, which have not already been transformed need to be processed.

Constrained Cell Area Minimization Problem

The principle behind the computation of the polygon is governed by the following three ideas.

The area of the polygon should be as small as possible, thereby maximizing the accuracy.

The constraint of the confidence value should be maintained, for the high-precision measurements available.

Basic geometrical constraints on the polygon should be maintained, in particular the requirement that the polygon should not be allowed to intersect itself, and that the last numbered corner point is connected to the first (closeness).

The following minimization problem can then be set up for the computation of the corners of the polygon:

$$\{\hat{r}_1^p, \ldots, \hat{r}_{N_p}^p\} = \underset{r_1^p, \ldots, r_{N_p}^p}{\arg\min} A^p(r_1^p, \ldots, r_{N_p}^p) \quad (5a)$$

subject to polygonal geometric constraints and (5b)

$$\sum_{\substack{j=1 \\ r_j^{m,p} \in P^p}}^{N_p^m} 1 \geq C^p N_p^m. \quad (5c)$$

This is a nonlinear optimization problem. Many methods that may be applicable to the solution of (5a-c), have been developed over the years.

In the following, a new algorithm is disclosed, that instead is based on a direct approach, adapted to the problem at hand. Note that this method may not solve (5a-c) exactly, however, it is based on the same ideas as (5a-c) but in a stepwise manner.

Shrinking Polygon Algorithm

The main idea of this algorithm is to start with an initial polygon that contains all the high-precision measurements collected for the particular cell relation configuration. The initial polygon can e.g. be calculated from the centre of gravity of the high-precision measurements, followed by a calculation of the maximum distance from this centre of gravity, for all high-precision measurements. This defines a circle that contains all high-precision measurement points. The initial polygon is then selected to contain this circle.

Following this initial step, the area of the polygon is then reduced in steps, by movement of one selected corner point of the polygon inwards towards the momentary centre of gravity, so that one high-precision measurement point is eliminated from the interior of the polygon, for each step. The area reduction is performed so that the area reduction, at each step, is maximized over all corner points, at the same time as the constraints are maintained fulfilled.

Centre of Gravity

Since the high-precision measurements are treated as points (non-stochastic), the centre of gravity is the arithmetic mean, i.e.

$$r_{CG} = (x_{CG} \quad y_{CG}) = \frac{1}{N_p^{m,rem}} \sum_{q=1}^{N_p^{m,rem}} (x_q^{m,p,rem} \quad y_q^{m,p,rem})^T, \quad (6)$$

where the superscript rem indicates high-precision measurements that have not yet been removed from the interior of the shrinking polygon by the shrinking polygon algorithm.

Initiation

Since the initiation of the algorithm only affects the $N_p$ first steps of the algorithm, a conservative approach is taken here. The first step is to compute the maximum distance from the centre of gravity, i.e.

$$j_{max}^p = \max_j \sqrt{(x_j^{m,p} - x_{CG})^2 + (y_j^{m,p} - y_{CG})^2} \quad (7)$$

$$r^p = \sqrt{(x_j^{m,p} - x_{CG})^2 + (y_j^{m,p} - y_{CG})^2}. \quad (8)$$

Hence all high-precision measurements are now within a distance $r^p$ of the centre of gravity. Note that if a finite number of polygon corner points would be spread out around this circle, there is no guarantee that the polygon contains all high-precision measurement points.

Figure 7:
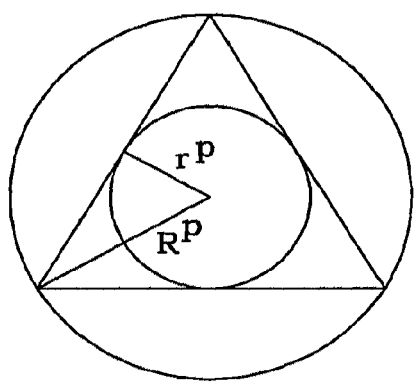
FIG. 7 is an in illustration of an initial geometry for a shrinking polygon method.

Since initial points, symmetrically spread around a circle, is attractive, an additional outer circle is determined, such that it contains the simplest polygon with three corners that contains the circle with radius $r^p$, see FIG. 7. The initial polygon corner points can then be spread out around this outer circle with radius $R^p$. It is geometrically obvious that the largest outer circle is obtained for a polygon defined by the minimum amount of corners, 3.

The outer radius can now be related to the computed inner radius by consideration of FIG. 7. Geometrical symmetry shows that $$R^p = \frac{r^p}{\sin(30)} = 2r^p. \quad (9)$$

The initial polygon corner points $\{r_i^{p,0}\}_{i=1}^{N_p}$ can then be distributed around the outer circle according to $$x_i^{p,0} = x_{CG} + R^p \cos\left(360 \frac{(i-1)}{N_p}\right) \quad (10)$$

$$y_i^{p,0} = y_{CG} + R^p \sin\left(360 \frac{(i-1)}{N_p}\right). \quad (11)$$

Other strategies are of course also possible.

Maximum Corner Movement

Note that the computations described in this subsection consider high-precision measurement points the remains in the interior of the shrinking polygon, at each iteration step. This is true for (12)-(21) and for (24)-(26), see below.

Movement with Respect to High-Precision Measurement Points

In order to assess which polygon corner that is most beneficial to move inwards at a given iteration step, it is first necessary to determine what the maximum movement is. This needs to take two constraints into account.

The second high-precision point that leaves the polygon when a specific corner point is moved inward along the specified direction towards the centre of gravity constrains the movement inwards. This requires a search over all high-precision measurement points that remain inside the polygon at the specific iteration step of the algorithm.

The first polygon line segment that is intersected when a specific corner point is moved inward along the specified direction towards the centre of gravity constrains the move inwards. This requires a search over all line segments (between polygon corner points) of the polygon.

Both these constraints need to be checked. Together they determine the inward maximum movement.

Figure 8:
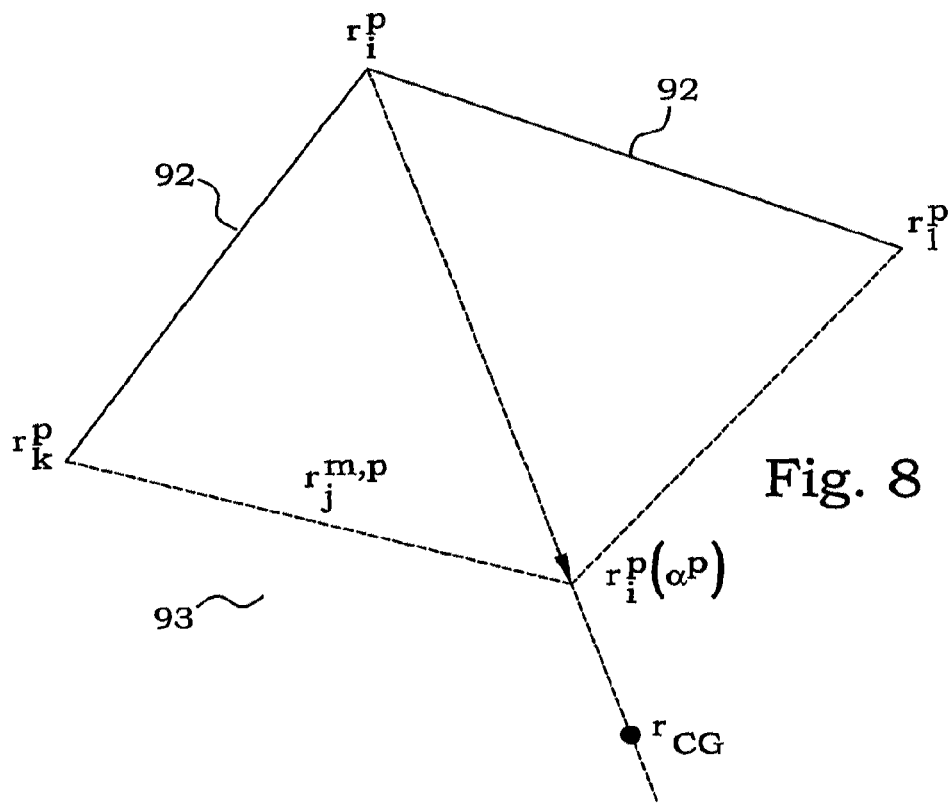
FIG. 8 is an illustration of the geometry used for determining a maximum polygon corner movement.

The maximum polygon corner movement with respect to a specific high-precision measurement point can be determined as follows, referring to FIG. 8. That figure shows a situation with three adjacent polygon corners $r_k^p$, $r_i^p$, $r_j^p$. The arbitrary numbering is due to the need to cover up for the fact that the last and the first of the polygon corner points are connected.

The middle point $r_i^p$ is then moved inwards towards the centre of gravity, i.e. into the interior 93 of the polygon. As a consequence the line segments 92 that connect $r_k^p$ and $r_i^p$, as well as $r_i^p$ and $r_j^p$ also move. At some point of the movement the considered high-precision measurement point may be intersected by either of these two line segments—both needs to be checked.

In order to determine a tentative point of intersection the movement of $r_i^p$ is computed to be $$r_i^p(\alpha^p) = r_i^p + \alpha^p(r_{CG} - r_i^p) \quad (12)$$

Here $\alpha^p$ is a scalar parameter that varies between 0 and 1 when $r_i^p(\alpha)$ moves between $r_i^p$ and $r_{CG}$. Note that this is a standard way to describe a line segment mathematically. Note also that movement may in this case extend beyond the centre of gravity.

A necessary (but not sufficient) requirement for an intersection of the moving boundary of the polygon with the considered high-precision measurement point, is that $r_i^p(\alpha^p) - r_k^p$ and $r_j^{m,p} - r_k^p$ become parallel, or that $r_i^p(\alpha^p) - r_i^p$ and $r_j^{m,p} - r_i^p$ become parallel. Exploiting the fact that the cross product between parallel vectors is zero, allows for a computation of $\alpha^p$. Straightforward algebra gives the results:

$$\alpha_{ik}^{j,p} = \frac{-(x_i^p - x_k^p)(y_j^{m,p} - y_k^p) + (x_j^{m,p} - x_k^p)(y_i^p - y_k^p)}{(x_{CG} - x_i^p)(y_j^{m,p} - y_k^p) - (x_j^{m,p} - x_k^p)(y_{CG} - y_i^p)} \quad (13)$$

$$\alpha_{il}^{j,p} = \frac{-(x_i^p - x_l^p)(y_j^{m,p} - y_l^p) + (x_j^{m,p} - x_l^p)(y_i^p - y_l^p)}{(x_{CG} - x_i^p)(y_j^{m,p} - y_l^p) - (x_j^{m,p} - x_l^p)(y_{CG} - y_i^p)}. \quad (14)$$

The subscripts indicate the polygon corner points that define the line segment under evaluation. The superscript denotes the index of the high-precision measurement point. Both (13) and (14) are candidates for being an active constraint. Note however, that a requirement for this is that $$\alpha_{ik}^{j,p} > 0 \quad (15)$$

$$\alpha_{il}^{j,p} > 0 \quad (16)$$

In case (15) and (16) do not hold, the corresponding intersection strategy needs to be discarded.

Assuming that (15) and (16) hold, it remains to check if the intersection point falls between the points that limit the line segment of the polygon. This means that the following equations need to be fulfilled, for some $\beta_{ik}^{j,p} \in [0,1]$ or $\beta_{il}^{j,p} \in [0,1]$:

$$r_j^{m,p} = r_i^p(\alpha_{ik}^{j,p}) + \beta_{ik}^{j,p}(r_k^p - r_i^p) \quad (17)$$

$$r_j^{m,p} = r_i^p(\alpha_{il}^{j,p}) + \beta_{il}^{j,p}(r_l^p - r_i^p). \quad (18)$$

Since the vectors leading to (13) and (14) are parallel, it is enough to consider one of the coordinates of (17) and (18) when solving for $\beta^p$. The results are:

$$\beta_{ik}^{j,p} = \frac{x_j^{m,p} - x_i^p(\alpha_{ik}^{j,p})}{x_k^p - x_i^p(\alpha_{ik}^{j,p})} \quad (19)$$

$$\beta_{il}^{j,p} = \frac{x_j^{m,p} - x_i^p(\alpha_{il}^{j,p})}{x_l^p - x_i^p(\alpha_{il}^{j,p})}. \quad (20)$$

The final logic needed in the evaluation of the point $r_j^{m,p}$, with respect to the movement of $r_i^p$, can be briefly summarized as follows. Provided that:

$\alpha_{ik}^{j,p} > 0$ and $0 < \beta_{ik}^{j,p} < 1$, $\alpha_{ik}^{j,p}$ represents a feasible maximum movement for the line segment between $r_i^p$ and $r_k^p$.

$\alpha_{ik}^{j,p} > 0$ and $\beta_{ik}^{j,p} > 1 \lor \beta_{ik}^{j,p} < 0$, $\alpha_{ik}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{ik}^{j,p} = \alpha_{max}$, where $\alpha_{max}$ is a large inward movement, say 10.

$\alpha_{ik}^{j,p} < 0$ and $0 < \beta_{ik}^{j,p} < 1$, $\alpha_{ik}^{j,p}$ represents a feasible maximum movement for the line segment between $r_i^p$ and $r_k^p$. However, since it is an outward movement, it shall be set to zero since the algorithm is designed for inward movement.

$\alpha_{il}^{j,p} > 0$ and $0 > \beta_{il}^{j,p} > 1$, $\alpha_{il}^{j,p}$ represents a feasible maximum movement for the line segment between $r_i^p$ and $r_l^p$.

$\alpha_{il}^{j,p} > 0$ and $\beta_{il}^{j,p} > 1 \lor \beta_{il}^{j,p} < 0$, $\alpha_{il}^{j,p}$ represents an inward point but the feasible maximum movement is not relevant since the intersection is outside the line segment between $r_i^p$ and $r_k^p$. In this case the inward movement shall not limit the minimum allowed inward movement. This is accomplished by setting $\alpha_{il}^{j,p} = \alpha_{max}$, where $\alpha_{max}$ is a large inward movement, say 10.

$\alpha_{il}^{j,p} < 0$ and $0 < \beta_{il}^{j,p} < 1$, $\alpha_{il}^{j,p}$ represents a feasible maximum movement for the line segment between $r_i^p$ and $r_k^p$. However, since it is an outward movement, it shall be set to zero since the algorithm is designed for inward movement.

In case both $\alpha_{ik}^{j,p}$ and $\alpha_{il}^{j,p}$ are feasible maximum movements, the smallest one is chosen. The considered cases can be summed as follows:

$$\alpha_i^{j,p} = \quad (21)$$

$$\begin{cases} \alpha_{max}, & \alpha_{ik}^{j,p} < 0, \alpha_{il}^{j,p} > 0, \beta_{ik}^{j,p} \notin [0,1], \beta_{il}^{j,p} \notin [0,1] \\ \alpha_{il}^{j,p} & \alpha_{ik}^{j,p} < 0, \alpha_{il}^{j,p} > 0, \beta_{ik}^{j,p} \notin [0,1], \beta_{il}^{j,p} \in [0,1] \\ \alpha_{max} & \alpha_{ik}^{j,p} < 0, \alpha_{il}^{j,p} > 0, \beta_{ik}^{j,p} \in [0,1], \beta_{il}^{j,p} \notin [0,1] \\ \alpha_{il}^{j,p} & \alpha_{ik}^{j,p} < 0, \alpha_{il}^{j,p} > 0, \beta_{ik}^{j,p} \in [0,1], \beta_{il}^{j,p} \in [0,1] \\ \alpha_{max} & \alpha_{ik}^{j,p} > 0, \alpha_{il}^{j,p} < 0, \beta_{ik}^{j,p} \notin [0,1], \beta_{il}^{j,p} \notin [0,1] \\ \alpha_{max} & \alpha_{ik}^{j,p} > 0, \alpha_{il}^{j,p} < 0, \beta_{ik}^{j,p} \notin [0,1], \beta_{il}^{j,p} \in [0,1] \\ \alpha_{ik}^{j,p} & \alpha_{ik}^{j,p} > 0, \alpha_{il}^{j,p} < 0, \beta_{ik}^{j,p} \in [0,1], \beta_{il}^{j,p} \notin [0,1] \\ \alpha_{ik}^{j,p} & \alpha_{ik}^{j,p} > 0, \alpha_{il}^{j,p} < 0, \beta_{ik}^{j,p} \in [0,1], \beta_{il}^{j,p} \in [0,1] \\ \alpha_{max} & \alpha_{ik}^{j,p} > 0, \alpha_{il}^{j,p} > 0, \beta_{ik}^{j,p} \notin [0,1], \beta_{il}^{j,p} \notin [0,1] \\ \alpha_{il}^{j,p} & \alpha_{ik}^{j,p} > 0, \alpha_{il}^{j,p} > 0, \beta_{ik}^{j,p} \notin [0,1], \beta_{il}^{j,p} \in [0,1] \\ \alpha_{ik}^{j,p} & \alpha_{ik}^{j,p} > 0, \alpha_{il}^{j,p} > 0, \beta_{ik}^{j,p} \in [0,1], \beta_{il}^{j,p} \notin [0,1] \\ \min(\alpha_{ik}^{j,p}, \alpha_{il}^{j,p}) & \alpha_{ik}^{j,p} > 0, \alpha_{il}^{j,p} > 0, \beta_{ik}^{j,p} \in [0,1], \beta_{il}^{j,p} \in [0,1] \\ 0 & \text{otherwise} \end{cases}$$

Note that some of the listed cases may never occur. This is of less consequence in case the computations are implemented in a consecutive way, following the order of presentation of this document.

Movement with Respect to Polygon Line Segments

The intersection between the line of movement as given by (12), and the line segment between $r_m^p$ and $r_n^p$, is given by the solution to the following system of equations, which is solved with respect to the parameters $\alpha_{i,mn}^p$ and $\gamma_{mn}^p$, where the subscript refer to the points involved in the computation $$r_i^p + \alpha_{i,mn}^p(r_{CG} - r_i^p) = \quad (22)$$

$$r_m^p + \gamma_{mn}^p(r_n^p - r_m^p) \Leftrightarrow ((r_{CG} - r_i^p) - (r_n^p - r_m^p))\begin{pmatrix} \alpha_{i,mn}^p \\ \gamma_{mn}^p \end{pmatrix} = r_m^p - r_i^p.$$

The solution shall not be computed for the points adjacent to $r_i^p$. Furthermore, the intersection between the two lines fall outside the relevant line segment between $r_m^p$ and $r_n^p$ in case $\gamma_{mn}^p \notin [0,1]$. If this is the case the intersection shall be disregarded in the evaluation of the corner $r_i^p$. The requirement that $\alpha_{i,mn}^p > 0$ also remains. Note also that it is only needed to solve (22) once for each corner point and iteration step of the algorithm.

To obtain the complete picture, (22) is first solved for all line segments, excluding the ones that are adjacent to $r_i^p$. The solution with the minimum value of $\alpha_{i,mn}^p$, such that $\alpha_{i,mn}^p > 0$ and $\gamma_{mn}^p \in [0,1]$, is expressed as (note that since the movement is inward such a solution always exists)

$$\alpha_{i,m_0n_0}^p, \gamma_{m_0n_0}^p \quad (23)$$

Combination

Since all high-precision measurement points are evaluated along the same direction as far as constraints are concerned, they can be directly combined. Note also that since one point is to be removed from the interior of the polygon for each iteration step, the limiting high-precision measurement point is to be selected as the second one that becomes active. The high-precision measurement point that becomes an active constraint is hence given by (24), where (24) can be calculated as follows $$j_{first} = \operatorname*{argmin}_{\substack{j \\ r_j^{m,p} \in P^p}} \alpha_i^{j,p} \quad (24)$$

$$j_{activeConstraint} = \operatorname*{argmin}_{\substack{j \neq j_{first} \\ r_j^{m,p} \in P^p}} \alpha_i^{j,p}$$

The corresponding movement becomes $$\alpha_i^{p,measurementConstraints} = \alpha_i^{j_{activeConstraint},p}. \quad (25)$$

The result (25) is finally combined with the constraint imposed by the possibility of self-intersection $$\alpha_i^{p,allConstraints} = \min(\alpha_i^{p,measurementConstraints}, \alpha_{i,m_0n_0}^p) - \in, \quad (26)$$

where $\in$ is a small number that prevents that the constraint becomes exactly active, so that the search is started outside the constraining point in the next iteration step.

Obtained Polygon Area Reduction

Figure 9:
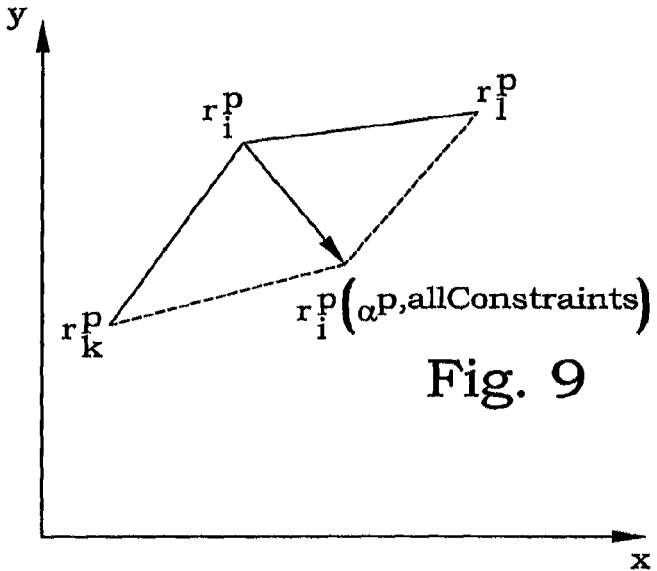
FIG. 9 is an illustration of the geometry for calculation of the area reduction.

The obtained are reduction follows by integration, or equivalently, computation of the areas under the parts of the polygon shown in FIG. 9.

By consideration of the facts that the area under the curve can be computed as sums of areas of rectangles and triangles, it is only the areas related to the moving and adjacent points that are affected by the movement, it follows that the areas before and after movement can be expressed as:

$$A_{i,before}^P = A_0 + \frac{1}{2}(x_i^p - x_k^p)(y_k^p + y_i^p) + \frac{1}{2}(x_l^p - x_i^p)(y_i^p + y_l^p) \quad (27)$$

$$A_{i,after}^P = A_0 + \frac{1}{2}(x_i^p(\alpha_i^{p,allConstraints}) - x_k^p)(y_k^p + y_i^p(\alpha_i^{p,allConstraints})) + \quad (28)$$
$$\frac{1}{2}(x_l^p - x_i^p(\alpha_i^{p,allConstraints}))(y_i^p(\alpha_i^{p,allConstraints}) + y_l^p).$$

The reduction of area obtained is hence given by $$\Delta A_i^{p,allConstraints} = \left| \frac{1}{2}(x_i^p - x_k^p)(y_k^p + y_i^p) + \frac{1}{2}(x_l^p - x_i^p)(y_i^p + y_l^p) - \quad (29) \right.$$
$$\frac{1}{2}(x_i^p(\alpha_i^{p,allConstraints}) - x_k^p)(y_k^p + y_i^p(\alpha_i^{p,allConstraints})) -$$
$$\left. \frac{1}{2}(x_l^p - x_i^p(\alpha_i^{p,allConstraints}))(y_i^p(\alpha_i^{p,allConstraints}) + y_l^p) \right|.$$

The maximum of this area reduction measure determines which of the $N_p$ corners to move at a specific iteration, whereas (12) and (26) determine the movement.

The Algorithm

In the algorithm below $N_p^{m,rem}$ denotes the number of high-precision measurement points that remain in the interior of the polygon, at each corner movement iteration step. The algorithm for polygon computation, for one specific cell relation configuration p is then:

Initialization:
  Compute the centre of gravity of all high-precision measurements of the cluster (6).
  Compute the maximum distance r from the centre of gravity (7), (8).
  Compute the initial polygon distributed around the circle R (9), (10), (11).
Area Minimization:
  Repeat until $N_p^{m,rem} < C^p N_p^m$ or $\alpha_i^{p,allConstraints} \leq 0$ (Measurement removal loop).
  Compute the centre of gravity for the points that remain in the interior of the polygon (6).
  For i=1 to $N_p$ (Corner movement evaluation loop).
    For j=1 to $N_p^{m,rem}$ (Measurement point constraint evaluation loop).
      Compute and store allowed, point-wise constrained, corner movement (21).
    End (Measurement point constraint evaluation loop).
    Compute and store allowed combined, measurement constrained, movement (24), (25).
    Compute and store allowed, self-intersection constrained, movement (23).
    Compute and store combined allowed, measurement and self-intersection constrained, movement (26).
    Compute and store area reduction (29), corresponding to (26).
  End (Corner movement evaluation loop).
  Find the corner with index $i_0$ corresponding to the maximum area reduction.
  Update (12) the corner $i_0$ with the movement $\alpha_{i_0}^{p,allConstraints}$.

Remove the high-precision measurement point that is no longer in the interior of the polygon, from any lists of interior points.

$N_p^{m,rem} := N_p^{m,rem} - 1$.

End (Measurement removal loop).
Transform the final corner points of the polygon to WGS 84c latitudes and longitudes.

NUMERICAL EXAMPLE

Figure 10A:
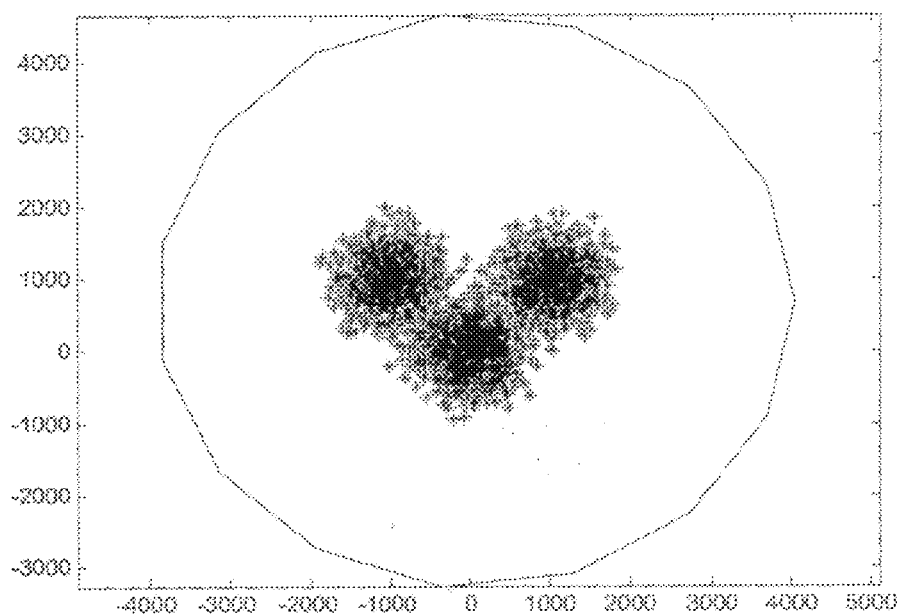
FIG. 10A is an illustration of an initiation of a numerical example of polygon computation.
Figure 10B:
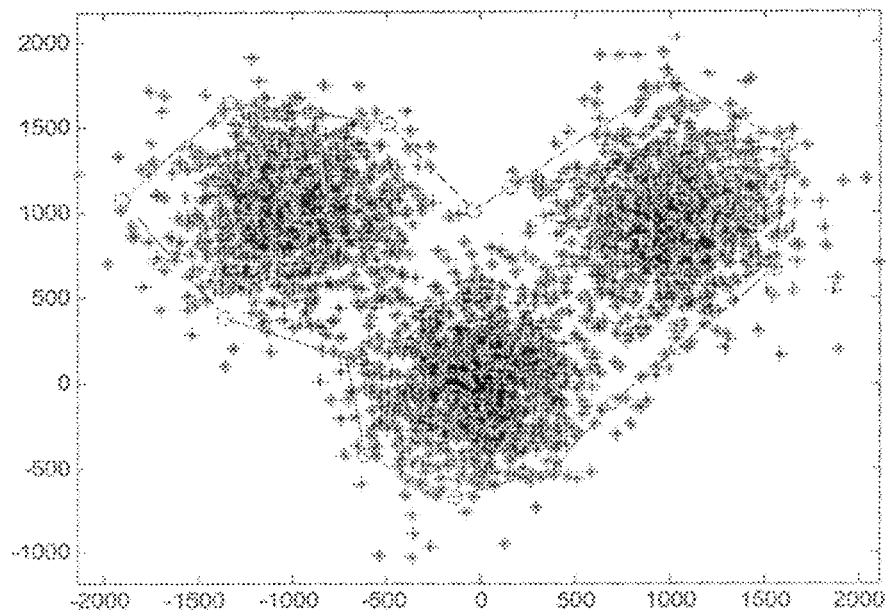
FIG. 10B is an illustration of the result of the polygon shrinking algorithm applied on FIG. 10A.

Since the clustering algorithm is relatively simple, an example showing the operation of the polygon shrinking algorithm is shown in FIGS. 10A-B. In the example 3000 high-precision measurement points were generated, according to the figure. As can be seen there are three overlapping "hot spots" in a v-shaped configuration around which the measurements are clustered. A 15 corner polygon, initiated according to FIG. 10A was optimized using a prescribed confidence of 95%. The result is excellent, see FIG. 10B.

The invention claimed is:

1. A method for providing position determination assisting data in a cellular communications network, comprising the steps of:
  receiving from each of multiple user equipments (UEs) having a global positioning system (GPS) receiver repeated determinations of a cell relation configuration and a measured high precision, GPS position of the UE, wherein the GPS position of the UE is determined using the UE's GPS receiver,
  wherein the cell relation configuration for each UE includes at least cell identity information of cells in which radio signals to or from the UE fulfill at least a specific radio condition criterion,
  forming, in a network node, for one or more of the cell relation configurations a cluster listing multiple ones of the measured high-precision, GPS positions having that cell relation configuration,
  wherein each cluster listing of measured high-precision, GPS positions identifies a specific geographic area;
  deterministically associating, in a network node, an area definition that defines a geographic location area polygon in the cellular communications network for multiple ones of the cluster listings, wherein the area definition is associated with a confidence value; and
  creating a database of position determination assisting data that specifies a relation between each of the multiple ones of the cell relation configurations and its deterministically associated area definition.

2. The method according to claim 1, wherein the specific radio condition criterion is one that is used in at least one of soft handover and softer handover.

3. The method according to claim 1, wherein the specific radio condition criterion is that the radio signal enables identification of the cell of the transmitting/receiving node.

4. The method according to claim 1, wherein the cell relation configuration further comprises an ordering of cell identities included in the cell identity information.

5. The method according to claim 4, wherein the ordering is associated with a signal-strength related quantity.

6. The method according to claim 5, wherein the signal-strength related quantity is selected from: signal strength, path loss, and signal-to-interference ratio.

7. The method according to claim 1, wherein the area definition contains a predetermined percentage of the measured high-precision, GPS positions.

8. The method according to claim 7, wherein an area measure of the area definition is minimized.

9. The method according to claim 1, wherein the confidence value is determined from the number of high precision GPS positions in the associated cluster list and a pre-specified parameter.

10. The method according to claim 1, wherein the polygon is a polygon determined using a shrinking polygon algorithm, and wherein the associated confidence value is determined using the shrinking polygon algorithm.

11. The method according to claim 1, wherein the deterministic associating comprises:
   encompassing each cluster list of the measured high-precision, GPS positions by its associated polygon;
   altering positions of corners of the polygon along predetermined paths to improve a predetermined criterion while maintaining at least a predetermined percentage of the measured high-precision, GPS positions of the cluster within the polygon.

12. The method according to claim 11, wherein the improvement is an optimization of a current altering step.

13. The method according to claim 11, wherein the altering step is repeated until another altering step would invalidate the predetermined percentage of measured high-precision, GPS positions of the cluster list within the polygon.

14. The method according to claim 11, wherein the predetermined criterion is an as-large-an-area reduction of the polygon as possible.

15. The method according to claim 11, wherein the predetermined criterion is an as-large-a-distance reduction as possible between a center of gravity of all measured high-precision, GPS positions within the area definition and the altered corners.

16. The method according to claim 11, wherein the predetermined path is a curve through an original corner position and a center of gravity for the measured high-precision, GPS positions of the cluster list within the polygon.

17. The method according to claim 16, wherein the curve is a straight line through the original corner position and the center of gravity.

18. The method according to claim 11, wherein the altering comprises altering of one corner position at a time, allowing one but not two of the measured high-precision, GPS positions of the cluster list to be placed outside the polygon.

19. The method according to claim 18, wherein the altering alters one corner position at a time and brings one of the measured high-precision, GPS positions of the cluster list to be placed on a linear segment between the corner that is altered and a neighboring corner.

20. The method according to claim 11, wherein more than one of the measured high-precision, GPS positions of the cluster list are allowed to be placed outside the polygon.

21. The method according to claim 11, wherein the position of the corner of the polygon is tentatively altered along more than one predetermined path and the predetermined path is selected as the path giving the best results according to the predetermined criterion.

22. The method according to claim 1, wherein the measured high-precision, GPS positions to be clustered are selected according to a further criterion.

23. The method according to claim 22, wherein the further criterion is based on at least one of auxiliary information about circumstances of signaling and auxiliary measurements of signaling properties.

24. The method according to claim 23, further comprising the step of recording a measuring instant of the measured high-precision, GPS positions, wherein the further criterion is based on at least the measuring instant.

25. The method according to claim 24, wherein only results of the high-precision position determinations younger than a predetermined age are clustered.

26. The method according to claim 24, wherein only the measured high-precision, GPS positions measured during one or several predetermined time periods of a day, week, or year are clustered.

27. The method according to claim 23, further comprising recording a type of radio access bearer used during the high-precision, GPS position measurements, wherein the further criterion is based on at least the type of radio access bearer.

28. The method according to claim 23, further comprising recording a round trip time for a radio signal with respect to a particular base station, wherein the further criterion is based on at least the round trip time.

29. The method according to claim 1, wherein the forming, associating, and creating steps are performed continuously or intermittently.

30. The method according to claim 29, wherein the clustering, associating and creating steps are performed for at least one of possible cell relation configurations.

31. The method according to claim 30, further comprising storing a last measured high-precision, GPS position in a non-transitory, computer-readable memory.

32. The method according to claim 1, wherein the forming, associating, and creating steps are performed when a position determination is requested.

33. A method for radio network planning, comprising:
   obtaining position determination assisting data provided according to claim 1,
   wherein the high-precision, GPS position measurements are performed on demand, and
   evaluating the position determination assisting data regarding actual radio propagation.

34. A method for determining a position of a user equipment in a cellular communications network, comprising:
   obtaining position determination assisting data provided according to claim 1, and
   determining, based on the position determination assisting data, an area definition defining a geographic area in which the user equipment is positioned.

35. The method according to claim 34, further comprising:
   providing at least one of auxiliary information about circumstances of signaling and auxiliary measurements of signaling properties,
   wherein the area definition is based also on the at least one of auxiliary information about circumstances of signaling and auxiliary measurements of signaling properties.

36. A method for determining a position of a user equipment in a cellular communications network, comprising:
   determining an initial position of the user equipment according to claim 34, and
   refining the initial position by a refined positioning method.

37. The method according to claim 36, wherein the refined positioning method is based on UTDOA measurements, on RTT measurements, or on assisted GPS.

38. The method according to claim 1, wherein the high-precision, GPS position measurements are assisted-GPS (A-GPS) measurements.

39. The method according to claim 1, wherein each of the high precision, GPS position measurements is a measurement of opportunity.

40. A non-transitory computer-readable memory device comprising position determination assisting data provided according to claim 1.

41. An arrangement for providing position determination assisting data in a cellular communications network, comprising:
- a receiver configured to receive from each of multiple user equipments (UEs) having a global positioning system (GPS) receiver repeated determinations of a cell relation configuration and a measured high precision, global positioning system (GPS) position of the UE,
- wherein the cell relation configuration for each UE includes at least cell identity information of cells in which radio signals to or from the UE fulfill at least a specific radio condition criterion, and
- computer apparatus configured to:
- form for one or more cell relation configurations a cluster listing multiple ones of the measured high-precision, GPS positions having that cell relation configuration,
- wherein each cluster listing of measured high-precision, GPS positions identifies a specific geographic area;
- deterministically associate an area definition that defines a geographic location area polygon in the cellular communications network for multiple ones of the cluster listings, wherein the area definition is associated with a confidence value; and
- create a database of position determination assisting data that specifies a relation between each of the multiple ones of the cell relation configurations and its deterministically associated area definition.

42. An arrangement for determining a position of a user equipment in a cellular communications network, comprising:
- an arrangement for obtaining position determination assisting data according to claim 41;
- the computer apparatus being configured to determine, based on the position determination assisting data, an area definition defining a geographic area in which the user equipment is positioned.

43. The arrangement according to claim 42, wherein the computer apparatus is configured to refine the area in which the user equipment is positioned by a refined positioning method.

44. The arrangement according to claim 43, wherein the computer apparatus is configured to perform a UTDOA positioning.

45. The arrangement according to claim 42, wherein the high-precision, GPS position measurements are assisted-GPS (A-GPS) measurements, and wherein each of the high precision, GPS position measurements is a measurement of opportunity.

46. A node of a cellular communications network comprising an arrangement according to claim 42.

47. The node according to claim 46, being a node selected from the list of:
- base station;
- base station controller;
- radio network controller;
- service mobile location center; and
- stand alone service mobile location center.

48. A cellular communications network, comprising an arrangement according to claim 42.

* * * * *

UNITED STATES PATENT AND TRADEMARK OFFICE
CERTIFICATE OF CORRECTION

PATENT NO. : 8,315,632 B2
APPLICATION NO. : 11/992920
DATED : November 20, 2012
INVENTOR(S) : Wigren It is certified that error appears in the above-identified patent and that said Letters Patent is hereby corrected as shown below:

In the Specifications:

In Column 2, Line 48, delete "Tune" and insert -- Time --, therefor.

In Column 6, Line 47, delete "FIG. 2A-E" and insert -- FIGS. 2A-E --, therefor.

In Column 6, Line 51, delete "full" and insert -- fulfil --, therefor.

In Column 16, Line 7, delete "P" and insert -- p --, therefor.

In Column 17, Line 12, delete "superscript rem" and insert -- superscript$^{rem}$ --, therefor.

In Column 18, Line 19, delete " $r_i^p$ " and insert -- $\mathbf{r}_i^\mathbf{p}$ --, therefor.

In Column 18, Line 25, delete "r$^p_i$ and r$^p_i$" and insert -- r$^p_i$ and r$^p_l$ --, therefor.

In Column 18, Line 32, in Equation (12), delete " $r_i^p(\alpha^p) = r_i^p + \alpha^p(r_{CG} - r_i^p)$ " and insert -- $\mathbf{r}_l^\mathbf{p}(\alpha^\mathbf{p}) = \mathbf{r}_l^\mathbf{p} + \alpha^\mathbf{p}(\mathbf{r}_{CG} - \mathbf{r}_l^\mathbf{p})$ --, therefor.

In Column 18, Line 34, delete "r$^p_i$(α) moves between r$^p_i$ and r$_{CG}$." and insert -- r$^p_l$(α) moves between r$^p_l$ and r$_{CG}$. --, therefor.

In Column 19, Line 31, delete " $\alpha_{ii'}^{j,p} 0$ and $0 > \beta_{ii'}^{j,p} > 1$, $\alpha_{ii'}^{j,p}$ " and insert -- $\alpha_{ii'}^{j,p} > 0$ and $0 < \beta_{ii'}^{j,p} < 1$, $\alpha_{ii'}^{j,p}$ --, therefor.

Signed and Sealed this
Fourteenth Day of May, 2013

Teresa Stanek Rea
*Acting Director of the United States Patent and Trademark Office*